United States Patent
Akai et al.

(10) Patent No.: US 12,215,224 B2
(45) Date of Patent: Feb. 4, 2025

(54) UNSATURATED POLYESTER RESIN COMPOSITION, MOLDING MATERIAL, MOLDED ARTICLE, AND BATTERY PACK CASING FOR ELECTRIC VEHICLE

(71) Applicant: JAPAN COMPOSITE CO., LTD., Tokyo (JP)

(72) Inventors: Ikuo Akai, Shizuoka (JP); Masahiro Hakotani, Shizuoka (JP); Takashi Tsukamoto, Shizuoka (JP)

(73) Assignee: JAPAN COMPOSITE CO., LTD., Tokyo (JP)

( * ) Notice: Subject to any disclaimer, the term of this patent is extended or adjusted under 35 U.S.C. 154(b) by 778 days.

(21) Appl. No.: 17/424,917

(22) PCT Filed: Jan. 29, 2020

(86) PCT No.: PCT/JP2020/003218
§ 371 (c)(1),
(2) Date: Jul. 22, 2021

(87) PCT Pub. No.: WO2020/162288
PCT Pub. Date: Aug. 13, 2020

(65) Prior Publication Data
US 2022/0089864 A1    Mar. 24, 2022

(30) Foreign Application Priority Data
Feb. 5, 2019    (JP) .................. 2019-019045

(51) Int. Cl.
*C08L 67/06*    (2006.01)
*H01M 50/224*    (2021.01)
(Continued)

(52) U.S. Cl.
CPC ........... *C08L 67/06* (2013.01); *H01M 50/224* (2021.01); *H01M 50/227* (2021.01);
(Continued)

(58) Field of Classification Search
CPC ... C08L 67/06; H01M 50/249; H01M 50/227; H01M 50/229
See application file for complete search history.

(56) References Cited

U.S. PATENT DOCUMENTS 6,592,986 B1 * 7/2003 Hakotani ............... H01B 1/24
428/297.4
7,285,334 B1 * 10/2007 Yamashita .......... H01M 50/122
428/458
(Continued)

FOREIGN PATENT DOCUMENTS

JP    2007-191718 A    8/2007
JP    2008-155392 A    7/2008
(Continued)

*Primary Examiner* — Jonathan G Jelsma
(74) *Attorney, Agent, or Firm* — RANKIN, HILL & CLARK LLP

(57) ABSTRACT

An unsaturated polyester resin composition includes an unsaturated polyester, a polymerizable monomer, a low shrinkage agent, aluminum hydroxide, and an electrically conductive filler. The unsaturated polyester is a polymerization product of a polybasic acid including a polybasic acid having an ethylenically unsaturated double bond at a predetermined ratio and a polyhydric alcohol. A polyvinyl acetate as the low shrinkage agent is included at a predetermined ratio with respect to the total amount of the unsaturated polyester, the polymerizable monomer, and the low shrinkage agent. The aluminum hydroxide is included at a predetermined ratio with respect to the total amount of the unsaturated polyester, the polymerizable monomer, and the low shrinkage agent.

12 Claims, 1 Drawing Sheet

(51) Int. Cl.
*H01M 50/227* (2021.01)
*H01M 50/229* (2021.01)
*H01M 50/233* (2021.01)
*H01M 50/249* (2021.01)

(52) U.S. Cl.
CPC ....... *H01M 50/229* (2021.01); *H01M 50/233* (2021.01); *H01M 50/249* (2021.01); *H01M 2220/20* (2013.01)

(56) References Cited

U.S. PATENT DOCUMENTS

2007/0154771 A1* 7/2007 Jang .............................. C08J 5/04
  252/511
2010/0178487 A1* 7/2010 Arai ....................... D06M 11/83
  428/300.1

FOREIGN PATENT DOCUMENTS

| | | |
|---|---|---|
| JP | 2009-209269 A | 9/2009 |
| JP | 2009197129 A * | 9/2009 |

* cited by examiner

UNSATURATED POLYESTER RESIN COMPOSITION, MOLDING MATERIAL, MOLDED ARTICLE, AND BATTERY PACK CASING FOR ELECTRIC VEHICLE

TECHNICAL FIELD

The present invention relates to an unsaturated polyester resin composition, a molding material, a molded article, and a battery pack casing for an electric vehicle, to be specific, to an unsaturated polyester resin composition, a molding material including the unsaturated polyester resin composition, a molded article including a cured product of the molding material, and a battery pack casing for an electric vehicle including the cured product of the molding material.

BACKGROUND ART

Conventionally, a molded article made of a molding material including an unsaturated polyester resin (particularly, SMC (sheet molding compound)) has replaced a portion of a steel plate of a car due to its excellent appearance, mechanical properties, water resistance, corrosion resistance, and the like.

As such a molding material, for example, a molding material including an unsaturated polyester resin, a low shrinkage agent, carbon calcium as a filler, and a carbon fiber as a reinforcing fiber has been proposed (ref: for example, Patent Document 1 below).

Then, more specifically, the molded article made of such a molding material is used in combination with the steel plate mainly in a part where rigidity and heat resistance are required such as an engine oil pan and a rocker cover in addition to a trunk lid and a bonnet.

CITATION LIST

Patent Document

Patent Document 1: Japanese Unexamined Patent Publication No. 2009-209269

SUMMARY OF THE INVENTION

Problem to be Solved by the Invention

Recently, from the viewpoint of weight reduction, such a molded article is desired to be used in combination with a light metal in addition to the steel plate.

However, a linear expansion coefficient of the molded article made of the molding material of Patent Document 1 is smaller than that of the light metal. Therefore, there is a problem that a combination of the molded article with the light metal decreases dimensional stability due to a difference between the linear expansion coefficient of the molded article and the linear expansion coefficient of the light metal.

Further, such a molded article may also require low shrinkage for reducing warping and deformation, and flame retardancy for delayed burning during vehicle fires.

Further, when such a molded article is used as a battery pack casing for an electric vehicle, electromagnetic shielding properties for blocking electromagnetic waves radiated from a battery may be required.

The present invention provides an unsaturated polyester resin composition for obtaining a molded article which has excellent low shrinkage and flame retardancy, has excellent electromagnetic shielding properties, and has excellent dimensional stability even in combination with a light metal component; a molding material including the unsaturated polyester resin composition; a molded article including a cured product of the molding material, and a battery pack casing for an electric vehicle including the cured product of the molding material.

Means for Solving the Problem

The present invention [1] includes an unsaturated polyester resin composition including an unsaturated polyester, a polymerizable monomer, a low shrinkage agent, aluminum hydroxide, and an electrically conductive filler, wherein the unsaturated polyester is a polymerization product of a polybasic acid and a polyhydric alcohol; the polybasic acid includes a polybasic acid having an ethylenically unsaturated double bond; a mixing ratio of the polybasic acid having an ethylenically unsaturated double bond is 80 mol % or more with respect to 100 mol % of the polybasic acid; the low shrinkage agent includes polyvinyl acetate; a mixing ratio of the polyvinyl acetate is 3 parts by mass or more and 10 parts by mass or less with respect to 100 parts by mass of the total amount of the unsaturated polyester, the polymerizable monomer, and the low shrinkage agent; and a mixing ratio of the aluminum hydroxide is 50 parts by mass or more and 300 parts by mass or less with respect to 100 parts by mass of the total amount of the unsaturated polyester, the polymerizable monomer, and the low shrinkage agent.

The present invention [2] includes the unsaturated polyester resin composition described in the above-described [1], wherein a mixing ratio of the electrically conductive filler is 8 parts by mass or more and 25 parts by mass or less with respect to 100 parts by mass of the total amount of the unsaturated polyester, the polymerizable monomer, and the low shrinkage agent.

The present invention [3] includes the unsaturated polyester resin composition described in the above-described [1] or [2], wherein the electrically conductive filler includes an electrically conductive fiber.

The present invention [4] includes the unsaturated polyester resin composition described in the above-described [3], wherein a mixing ratio of the electrically conductive fiber is 8 parts by mass or more and 21 parts by mass or less with respect to 100 parts by mass of the total amount of the unsaturated polyester, the polymerizable monomer, and the low shrinkage agent.

The present invention [5] includes the unsaturated polyester resin composition described in the above-described [3] or [4], wherein the electrically conductive fiber includes an electrically conductive short fiber having a fiber length of 0.01 mm or more and 0.15 mm or less, and a mixing ratio of the electrically conductive short fiber is 12% by mass or more and 50% by mass or less with respect to the electrically conductive fiber.

The present invention [6] includes the unsaturated polyester resin composition described in the above-described [3] or [4], wherein the electrically conductive fiber includes an electrically conductive long fiber having a fiber length of 1.5 mm or more and 5 mm or less, and a mixing ratio of the electrically conductive long fiber is 10% by mass or more and 30% by mass or less with respect to the electrically conductive fiber.

The present invention [7] includes the unsaturated polyester resin composition described in any one of the above-described [1] to [6], wherein the electrically conductive filler includes an electrically conductive particle.

The present invention [8] includes the unsaturated polyester resin composition described in the above-described [7], wherein a mixing ratio of the electrically conductive particle is 1 part by mass or more and 5 parts by mass or less with respect to 100 parts by mass of the total amount of the unsaturated polyester, the polymerizable monomer, and the low shrinkage agent.

The present invention [9] includes the unsaturated polyester resin composition described in any one of the above-described [1] to [8], wherein the electrically conductive filler includes a carbon nanotube.

The present invention [10] includes a molding material including the unsaturated polyester resin composition described in the above-described [1] to [9] and a reinforcing fiber.

The present invention [11] includes a molded article including a cured product of the molding material described in the above-described [10].

The present invention [12] includes the molded article described in the above-described [11], wherein a linear expansion coefficient is 17 ppm/° C. or more and 25 ppm/° C. or less.

The present invention [13] includes the molded article described in the above-described [11] or [12] for a battery pack casing for an electric vehicle.

The present invention [14] includes a battery pack casing for an electric vehicle including an aluminum member and the molded article described in any one of the above-described [11] to [13] used in combination with the aluminum member.

Effect of the Invention

In the unsaturated polyester resin composition of the present invention, a polybasic acid of an unsaturated polyester includes a polybasic acid having an ethylenically unsaturated double bond at a predetermined ratio.

In addition, in the unsaturated polyester resin composition of the present invention, polyvinyl acetate which is a low shrinkage agent is included at a predetermined ratio with respect to the total amount of the unsaturated polyester, a polymerizable monomer, and the low shrinkage agent.

Therefore, a molded article obtained by using the unsaturated polyester resin composition has excellent low shrinkage.

In addition, in the unsaturated polyester resin composition of the present invention, aluminum hydroxide is included at a predetermined ratio with respect to the total amount of the unsaturated polyester, the polymerizable monomer, and the low shrinkage agent.

Therefore, a molded article obtained by using the unsaturated polyester resin composition has excellent flame retardancy, and has excellent dimensional stability even when used in combination with a light metal.

Further, the unsaturated polyester resin composition of the present invention includes an electrically conductive filler.

Therefore, the molded article obtained by using the unsaturated polyester resin composition has excellent electromagnetic shielding properties.

Since the molding material of the present invention includes the unsaturated polyester resin composition of the present invention, a molded article obtained by using the molding material has excellent low shrinkage and flame retardancy, has excellent electromagnetic shielding properties, and has excellent dimensional stability even when used in combination with a light metal.

Since the molded article of the present invention includes a cured product of the molding material of the present invention, it has excellent low shrinkage and flame retardancy, has excellent electromagnetic shielding properties, and has excellent dimensional stability even when used in combination with a light metal.

Since the battery pack casing for an electric vehicle of the present invention includes the molded article of the present invention, it has excellent low shrinkage and flame retardancy, and excellent electromagnetic shielding properties and dimensional stability.

DESCRIPTION OF EMBODIMENTS

Figure 1:
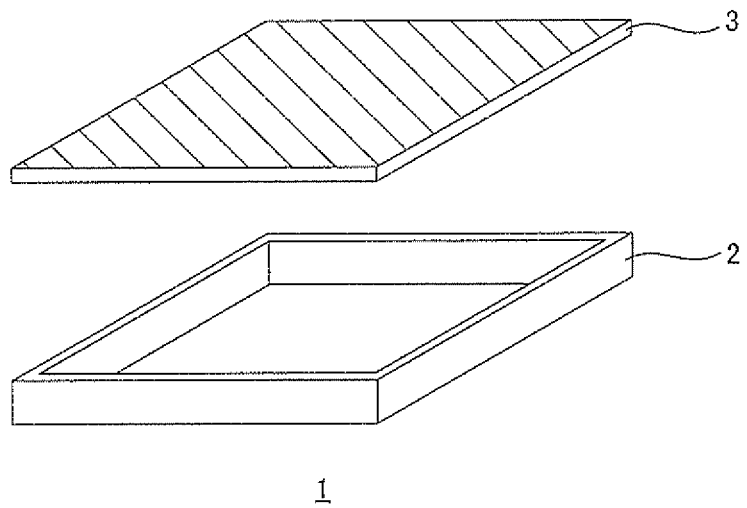
FIG. 1 shows a schematic perspective view illustrating one embodiment of a battery pack casing for an electric vehicle of the present invention.

An unsaturated polyester resin composition of the present invention includes a resin component, aluminum hydroxide, and an electrically conductive filler.

The resin component includes an unsaturated polyester, a polymerizable monomer, and a low shrinkage agent.

In other words, the unsaturated polyester resin composition includes the unsaturated polyester, the polymerizable monomer, the low shrinkage agent, the aluminum hydroxide, and the electrically conductive filler.

The unsaturated polyester is a polymerization product of a polybasic acid and a polyhydric alcohol.

The polybasic acid includes a polybasic acid having an ethylenically unsaturated double bond (hereinafter, referred to as an ethylenically unsaturated bond-containing polybasic acid) as an essential component and a polybasic acid without an ethylenically unsaturated double bond (hereinafter, referred to as an ethylenically unsaturated bond-free polybasic acid) as an optional component.

Examples of the ethylenically unsaturated bond-containing polybasic acid include ethylenically unsaturated aliphatic dibasic acids such as maleic acid, fumaric acid, itaconic acid, and dihydromuconic acid, halides of these acids, and alkyl esters of these acids.

Further, examples of the ethylenically unsaturated bond-containing polybasic acid include acid anhydride derived from the above-described ethylenically unsaturated aliphatic dibasic acid, and maleic anhydride.

As the ethylenically unsaturated bond-containing polybasic acid, preferably, a maleic anhydride and a fumaric acid are used.

Examples of the ethylenically unsaturated bond-free polybasic acid include saturated aliphatic polybasic acids, saturated alicyclic polybasic acids, aromatic polybasic acids, halides of these acids, and alkyl esters of these acids.

Examples of the saturated aliphatic polybasic acid include saturated aliphatic dibasic acids such as oxalic acid, malonic acid, succinic acid, methylsuccinic acid, 2,2-dimethylsuccinic acid, 2,3-dimethyl succinic acid, hexyl succinic acid, glutaric acid, 2-methylglutaric acid, 3-methylglutaric acid, 2,2-dimethylglutaric acid, 3,3-dimethylsuccinic acid, adipic acid, pimelic acid, suberic acid, azelaic acid, and sebacic acid.

Also, examples of the saturated aliphatic polybasic acid include acid anhydrides derived from the above-described saturated aliphatic dibasic acids, oxalic anhydrides, and succinic anhydrides.

Examples of the saturated alicyclic polybasic acid include saturated alicyclic dibasic acids such as HET acid, 1,2-hexahydrophthalic acid, 1,1-cyclobutanedicarboxylic acid, 1,4-cyclohexanedicarboxylic acid (cis- or trans-1,4-cyclohexanedicarboxylic acid or a mixture thereof), and dimer acid.

Examples of the aromatic polybasic acid include aromatic dibasic acids such as phthalic acid (orthophthalic acid, isophthalic acid, and terephthalic acid), trimellitic acid, and pyromellitic acid.

Also, examples of the aromatic polybasic acid include acid anhydrides derived from the above-described aromatic dibasic acid and phthalic anhydrides.

As the ethylenically unsaturated bond-free polybasic acid, preferably, an aromatic polybasic acid is used, more preferably, an aromatic dibasic acid is used, further more preferably, a phthalic acid is used, particularly preferably, an isophthalic acid is used.

These polybasic acids may be used alone or in combination of two or more.

In addition, in the unsaturated polyester, the polybasic acid includes an ethylenically unsaturated bond-containing polybasic acid at a predetermined ratio.

Specifically, when the ethylenically unsaturated bond-containing polybasic acid and the ethylenically unsaturated bond-free polybasic acid are used in combination, a mixing ratio of the ethylenically unsaturated bond-containing polybasic acid is 80 mol % or more, and for example, 99 mol % or less with respect to the polybasic acid.

In addition, when the ethylenically unsaturated bond-containing polybasic acid is used alone, a mixing ratio of the ethylenically unsaturated bond-containing polybasic acid is 100 mol % (that is, 80 mol % or more) with respect to the polybasic acid.

Preferably, an ethylenically unsaturated bond-containing polybasic acid is used alone.

In the unsaturated polyester, since the polybasic acid includes the ethylenically unsaturated bond-containing polybasic acid within the above-described range, the unsaturated polyester has high reactivity.

Examples of the polyhydric alcohol include alkanediols such as ethylene glycol, propylene glycol (1,2- or 1,3-propanediol or a mixture thereof), butylene glycol (1,2-, 1,3-, or 1,4-butylene glycol or a mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentanediol, and 3,3-dimethylolheptane; aliphatic diols such as ether diols including diethylene glycol, triethylene glycol, and dipropylene glycol; alicyclic diols such as cyclohexanediol (1,2-, 1,3-, or 1,4-cyclohexanediol or a mixture thereof), cyclohexanedimethanol (1,2-, 1,3-, or 1,4-cyclohexanedimethanol or a mixture thereof), cyclohexanediethanol (1,2-, 1,3-, or 1,4-cyclohexanediethanol or a mixture thereof), and hydrogenated bisphenol A; dihydric alcohols such as aromatic diols including bisphenol A, ethylene oxide adduct of bisphenol A, and propylene oxide adduct of bisphenol A; trihydric alcohols such as glycerin, trimethylolpropane, and triisopropanolamine; tetrahydric alcohols such as tetramethylolmethane (pentaerythritol) and diglycerin; pentahydric alcohols such as xylitol; and hexahydric alcohols such as sorbitol, mannitol, allitol, iditol, darcitol, altritol, inositol, and dipentaerythritol. Preferably, a dihydric alcohol is used, more preferably, an aliphatic diol is used, further more preferably, alkanediol is used, particularly preferably, propylene glycol and neopentyl glycol are used.

These polyhydric alcohols may be used alone or in combination of two or more, and preferably, propylene glycol and neopentyl glycol are used in combination.

The unsaturated polyester is obtained by polycondensation (condensation polymerization) of a polybasic acid with a polyhydric alcohol.

In order to subject the polybasic acid and the polyhydric alcohol to the polycondensation (condensation polymerization), the polybasic acid and the polyhydric alcohol are blended so as to have an equivalent ratio (hydroxyl group of the polyhydric alcohol/carboxyl group of the polybasic acid) of the polyhydric alcohol to the polybasic acid of, for example, 0.9 or more, preferably 0.95 or more, and for example, 1.2 or less, preferably 1.1 or less, and the obtained mixture is stirred at a normal pressure under a nitrogen atmosphere.

A reaction temperature is, for example, 150° C. or more, preferably 190° C. or more, and for example, 250° C. or less, preferably 230° C. or less.

The reaction time is, for example, 8 hours or more, and for example, 30 hours or less.

In the above-described reaction, if necessary, a known solvent and a known catalyst may be also blended.

Thus, the unsaturated polyester is obtained.

An acid value of the unsaturated polyester (measurement method: in conformity with JIS K6901 (2008)) is, for example, 20 mgKOH/g or more and below 40 mgKOH/g.

A weight average molecular weight of the unsaturated polyester is, for example, 6000 or more, preferably 8000 or more, and for example, 25000 or less, preferably 20000 or less.

The weight average molecular weight is a weight average molecular weight in terms of polystyrene by GPC (gel permeation chromatography), and can be determined by GPC measurement of the unsaturated polyester.

A mixing ratio of the unsaturated polyester is, for example, 20% by mass or more, and for example, 60% by mass or less with respect to the resin component.

The polymerizable monomer is a solvent for dissolving the unsaturated polyester, and is a cross-linkable monomer (reactive diluent) cross-linkable with the unsaturated polyester at the time of curing of an unsaturated polyester resin (described later). Examples thereof include styrene-based monomers such as styrene, α-methyl styrene, α-ethyl styrene, vinyltoluene t-butylstyrene, and chlorostyrene; alkyl (meth)acrylates such as methyl (meth)acrylate, ethyl (meth)acrylate, isopropyl (meth)acrylate, butyl (meth)acrylate, n-butyl (meth)acrylate, t-butyl (meth)acrylate, isobutyl (meth)acrylate, 2-ethylhexyl (meth)acrylate, lauryl (meth)acrylate, tridecyl (meth)acrylate, and stearyl (meth)acrylate; allyl (meth)acrylate esters such as allyl (meth)acrylate; cyclic structure-containing (meth)acrylates such as cyclohexyl (meth)acrylate, benzyl (meth)acrylate, isobornyl (meth)acrylate, glycidyl (meth)acrylate, tetrahydrofurfuryl (meth)acrylate, dicyclopentenyl (meth)acrylate, dicyclopentanyl (meth)acrylate, and dicyclopentenyloxyethyl (meth)acrylate; hydroxyl alkyl (meth)acrylates such as 2-hydroxyethyl (meth)acrylate and 2-hydroxypropyl (meth)acrylate; alkoxy alkyl (meth)acrylates such as 2-methoxyethyl (meth)acrylate and 2-ethoxyethyl (meth)acrylate; (meth)acrylic acid ester-based monomers such as amino alkyl (meth)acrylates including dimethyl amino ethyl (meth)acrylate and diethyl amino ethyl (meth)acrylate and chloride salts of these, and fluoroalkyl (meth)acrylates including trifluoroethyl (meth)acrylate and heptadecafluorodecyl (meth)acrylate; polyfunctional (meth)acrylates such as ethylene glycol di(meth)acrylate, diethylene glycol di(meth)acrylate, trimethylolpropane tri(meth)acrylate, pentaerythritol tetra(meth)acrylate, and dipentaerythritol hexa(meth)acrylate; and allyl-based monomers such as glycerin monoallyl ether, pentaerythritol diallyl ether, pentaerythritol monoallyl ether, and trimethylolpropane monoallyl ether. Preferably, a styrene-based monomer is used, more preferably, a styrene is used. (Meth)acryl is synonymous with methacrylic and/or acrylic.

These polymerizable monomers may be used alone or in combination of two or more.

A mixing ratio of the polymerizable monomer is, for example, 20% by mass or more, and for example, 60% by mass or less, preferably 50% by mass or less with respect to the resin component.

Further, a mixing ratio of the polymerizable monomer is, for example, 50 parts by mass or more, and for example, 200 parts by mass or less, preferably 100 parts by mass or less with respect to 100 parts by mass of the unsaturated polyester.

The low shrinkage agent is blended in order to suppress curing shrinkage and thermal shrinkage of a molded article (described later) when the molded article (described later) obtained by using the unsaturated polyester resin composition is obtained.

The low shrinkage agent includes polyvinyl acetate as an essential component.

The polyvinyl acetate can suppress the curing shrinkage and the thermal shrinkage of the molded article (described later).

Therefore, when the low shrinkage agent includes the polyvinyl acetate, the molded article (described later) obtained by using the unsaturated polyester resin composition has excellent low shrinkage.

A mixing ratio of the polyvinyl acetate is 3 parts by mass or more, preferably 5 parts by mass or more, and 10 parts by mass or less with respect to 100 parts by mass of the resin component.

When the mixing ratio of the polyvinyl acetate is the above-described lower limit or more, the molded article (described later) obtained by using the unsaturated polyester resin composition has excellent low shrinkage.

On the other hand, when the mixing ratio of the polyvinyl acetate is below the above-described lower limit, the low shrinkage decreases in the molded article (described later) obtained by using the unsaturated polyester resin composition.

When the mixing ratio of the polyvinyl acetate is the above-described upper limit or less, the molded article (described later) obtained by using the unsaturated polyester resin composition has excellent low shrinkage.

On the other hand, when the mixing ratio of the polyvinyl acetate is above the above-described upper limit, production stability decreases due to a decrease in film releasability at the time of production of the molding material.

Further, the low shrinkage agent includes, as an optional component, for example, another low shrinkage agent such as polystyrene, polyethylene, cross-linking polystyrene, polyvinyl acetate-polystyrene block copolymer, SBS (rubber), and saturated polyester resin.

The saturated polyester resin is obtained by dissolving the saturated polyester in the above-described polymerizable monomer.

The saturated polyester is a polymerization product of the above-described ethylenically unsaturated bond-free polybasic acid and the above-described polyhydric alcohol.

As the ethylenically unsaturated bond-free polybasic acid, preferably, a saturated aliphatic polybasic acid and an aromatic polybasic acid are used, more preferably, a saturated aliphatic dibasic acid and an aromatic dibasic acid are used, further more preferably, an adipic acid and an isophthalic acid are used.

These ethylenically unsaturated bond-free polybasic acids may be used alone or in combination of two or more.

As the polyhydric alcohol, preferably, a dihydric alcohol is used, more preferably, neopentyl glycol is used.

These polyhydric alcohols may be used alone or in combination of two or more.

The saturated polyester is obtained by subjecting the ethylenically unsaturated bond-free polybasic acid and the polyhydric alcohol to polycondensation (condensation polymerization).

In order to subject the ethylenically unsaturated bond-free polybasic acid and the polyhydric alcohol to the polycondensation (condensation polymerization), the ethylenically unsaturated bond-free polybasic acid and the polyhydric alcohol are blended so as to have an equivalent ratio (hydroxyl group of the polyhydric alcohol/carboxyl group of the polybasic acid) of the polyhydric alcohol to the polybasic acid of, for example, 0.9 or more, preferably 0.95 or more, and for example, 1.2 or less, preferably 1.1 or less, and the obtained mixture is stirred at a normal pressure under a nitrogen atmosphere.

A reaction temperature is, for example, 150° C. or more, preferably 190° C. or more, and for example, 250° C. or less, preferably 230° C. or less.

The reaction time is, for example, 8 hours or more, and for example, 30 hours or less.

In the above-described reaction, if necessary, a known solvent and a known catalyst may be also blended.

Thus, the saturated polyester is obtained.

An acid value of the saturated polyester (measurement method: in conformity with JIS K6901 (2008)) is, for example, 5 mgKOH/g or more and below 40 mgKOH/g.

Then, the saturated polyester is dissolved in the above-described polymerizable monomer (preferably, styrene), and if necessary, an additive (polymerization inhibitor (described later) (preferably, hydroquinone)) is blended thereto, thereby preparing a saturated polyester resin.

In the preparation of the saturated polyester resin, a mixing ratio of the polymerizable monomer is, for example, 35 parts by mass or more, and for example, 150 parts by mass or less with respect to 100 parts by mass of the saturated polyester; and a mixing ratio of the polymerization inhibitor is, for example, 0.001 parts by mass or more, preferably 0.005 parts by mass or more, and for example, 0.1 parts by mass or less, preferably 0.05 parts by mass or less with respect to 100 parts by mass of the saturated polyester.

These low shrinkage agents may be used alone or in combination of two or more, and preferably, polyvinyl acetate and a saturated polyester resin are used in combination.

In other words, the low shrinkage agent preferably includes the saturated polyester resin.

A mixing ratio of the saturated polyester is, for example, 1 part by mass or more, preferably 5 parts by mass or more, and for example, 15 parts by mass or less with respect to 100 parts by mass of the resin component.

A mixing ratio of the low shrinkage agent is, for example, 3% by mass or more, preferably 5% by mass or more, and for example, 30% by mass or less with respect to the resin component.

Further, a mixing ratio of the low shrinkage agent is, for example, 10 parts by mass or more, preferably 18 parts by mass or more, and is, for example, 50 parts by mass or less with respect to 100 parts by mass of the unsaturated polyester.

Further, the resin component includes, if necessary, another thermosetting resin (excluding the unsaturated polyester resin).

Examples of the other thermosetting resin include vinyl ester resins, brominated vinyl ester resins, and acrylic syrups.

The vinyl ester resin is obtained by dissolving a vinyl ester in the above-described polymerizable monomer.

The vinyl ester is a reaction product of a non-brominated epoxy resin and an unsaturated monobasic acid.

The non-brominated epoxy resin is a reaction product of a first phenol component and a first epoxy component.

The first phenol component includes a non-brominated bisphenol compound.

The non-brominated bisphenol compound is represented by the following general formula (1).

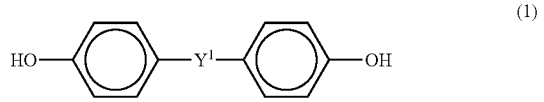

(In the formula, $Y^1$ represents any of —C(CH$_3$)$_2$—, —CH$_2$—, —O—, —S—, and —(O=S=O)—.) Examples of the non-brominated bisphenol compound include bisphenol A, bisphenol F, and bisphenol S, and preferably, bisphenol A is used.

These non-brominated bisphenol compounds may be used alone or in combination of two or more.

The first epoxy component includes a non-brominated epoxy compound.

The non-brominated epoxy compound is represented by the following general formula (2).

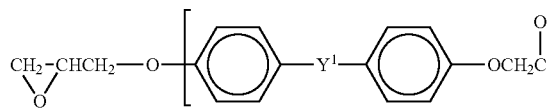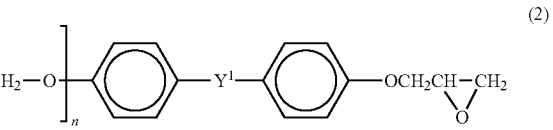

(In the formula, $Y^1$ is the same as $Y^1$ of the above-described formula (1), and "n" represents an integer of 0 to 5.) Examples of the non-brominated epoxy compound include bisphenol A epoxy resins, bisphenol F epoxy resins, and bisphenol S epoxy resins.

An epoxy equivalent of the non-brominated epoxy compound is, for example, 100 g/eq or more, preferably 150 g/eq or more, and for example, 800 g/eq or less, preferably 400 g/eq or less, more preferably below 300 g/eq, further more preferably 250 g/eq or less.

These non-brominated epoxy compounds may be used alone or in combination of two or more.

Then, in order to obtain the non-brominated epoxy resin, the first phenol component and the first epoxy component are reacted. Specifically, the non-brominated bisphenol compound and the non-brominated epoxy compound are blended to be reacted.

In the above-described reaction, the non-brominated bisphenol compound and the non-brominated epoxy compound are subjected to a chain extension reaction.

In addition, in the above-described reaction, a ratio of the first epoxy component is 0.5 equivalents or more, preferably 1.0 equivalent or more, preferably 2.0 equivalents or more, and for example, 4.0 equivalents or less with respect to 1 equivalent of the first phenol component.

In addition, in the above-described reaction, a catalyst can be added, if necessary.

Examples of the catalyst include amines such as triethylamine and benzyldimethylamine; quaternary ammonium salts such as tetramethylammonium chloride and triethylbenzylammonium chloride; imidazoles such as 2-ethyl-4-imidazole; amides; pyridines; phosphines such as triphenylphosphine; phosphonium salts such as tetraphenylphosphonium bromide and ethyltriphenylphosphonium bromide; sulfonium salts; sulfonic acids; and organic metal salts such as zinc octylate, and preferably, a quaternary ammonium salt is used, more preferably, triethylbenzylammonium chloride is used.

These catalysts may be used alone or in combination of two or more.

A mixing ratio of the catalyst is, for example, 0.01 parts by mass or more, preferably 0.1 parts by mass or more, and for example, 3.0 parts by mass or less, preferably 1.0 part by mass or less with respect to 100 parts by mass of the total amount of the first phenol component and the first epoxy component.

In addition, in the above-described reaction, if necessary, a polymerization inhibitor (described later) (preferably, hydroquinone) can be added.

A mixing ratio of the polymerization inhibitor is, for example, 0.001 parts by mass or more, preferably 0.005 parts by mass or more, and for example, 0.5 parts by mass or less, preferably 0.1 parts by mass or less with respect to 100 parts by mass of the total amount of the first phenol component and the first epoxy component.

Further, as reaction conditions, a reaction temperature is, for example, 80° C. or more, preferably 100° C. or more, and for example, 170° C. or less, and the reaction time is, for example, 1 hour or more, preferably 3 hours or more, and for example, 12 hours or less, preferably 10 hours or less.

Thus, the non-brominated epoxy resin is obtained.

An epoxy equivalent of the non-brominated epoxy resin is, for example, 200 g/eq or more, preferably 300 g/eq or more, and for example, 800 g/eq or less, preferably 400 g/eq or less.

Examples of the unsaturated monobasic acid include monocarboxylic acids such as (meth)acrylic acid, crotonic acid, cinnamic acid, and sorbic acid, and a reaction product of a dibasic acid anhydride and an alcohol having at least one unsaturated group in a molecule. Examples of the dibasic acid anhydride include maleic anhydride, succinic anhydride, phthalic anhydride, tetrahydrophthalic anhydride, and hexahydrophthalic anhydride. Examples of the alcohol having an unsaturated group include hydroxyethyl (meth)acrylate, hydroxypropyl (meth)acrylate, hydroxybutyl (meth)acrylate, pentaerythritol tri(meth)acrylate, and glycerin di(meth)acrylate.

These unsaturated monobasic acids may be used alone or in combination of two or more.

As the unsaturated monobasic acid, preferably, a monocarboxylic acid is used, more preferably, a (meth)acrylic acid is used, further more preferably, a methacrylic acid is used.

Then, in order to obtain a vinyl ester, the non-brominated epoxy resin and the unsaturated monobasic acid are reacted.

In the above-described reaction, an epoxy group of the non-brominated epoxy resin and the unsaturated monobasic acid are subjected to an addition reaction.

In addition, in the above-described reaction, an equivalent of a carboxyl group of the unsaturated monobasic acid to the epoxy group of the non-brominated epoxy resin is, for example, 1 or more, preferably 1.5 or more, and for example, 2.5 or less.

Further, as reaction conditions, a reaction temperature is, for example, 80° C. or more, preferably 100° C. or more, and for example, 150° C. or less, preferably 130° C. or less, and the reaction time is, for example, 1 hour or more, preferably 2 hours or more, and for example, 10 hours or less.

The above-described reaction can be also carried out following the reaction of the first phenol component and the first epoxy component described above.

Thus, the vinyl ester is obtained.

An acid value of the vinyl ester (measurement method: in conformity with JIS K6901 (2008)) is, for example, 5 mgKOH/g or more, and 20 mgKOH/g or less.

Then, the vinyl ester resin is prepared by dissolving the vinyl ester in the above-described polymerizable monomer (preferably, styrene).

The brominated vinyl ester resin is obtained by dissolving a brominated vinyl ester in the above-described polymerizable monomer.

The brominated vinyl ester resin is a reaction product of a brominated epoxy resin and the above-described unsaturated monobasic acid.

The brominated epoxy resin is a reaction product of a second phenol component and a second epoxy component.

The second phenol component includes a brominated bisphenol compound.

The brominated bisphenol compound is represented by the following general formula (3).

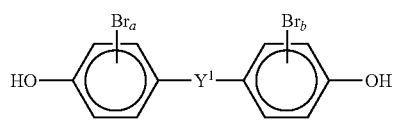

(In the formula, $Y^1$ is the same as $Y^1$ of the above-described formula (1), and "a" and "b" independently represent integers of 1 to 4.) Examples of the brominated bisphenol compound include tetrabromobisphenol A ([2,2-bis(3,5-dibromo-4-hydroxyphenyl)propane), dibromobisphenol A, tetrabromobisphenol F, and tetrabromobisphenol S.

These brominated bisphenol compounds may be used alone or in combination of two or more.

The second phenol component includes the above-described non-brominated bisphenol compound, if necessary.

The second epoxy component includes a brominated epoxy compound.

The brominated epoxy compound is represented by the following general formula (4).

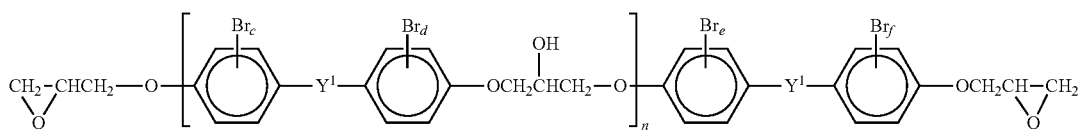

(In the formula, $Y^1$ is the same as $Y^1$ of the above-described formula (1), "c" to "f" independently represent integers of 1 to 4, and "n" represents an integer of 0 to 5.) Examples of the brominated epoxy compound include tetrabromobisphenol A epoxy resins, dibromobisphenol A epoxy resins, tetrabromobisphenol F epoxy resins, and tetrabromobisphenol S epoxy resins.

An epoxy equivalent of the brominated epoxy compound is, for example, 100 g/eq or more, preferably 200 g/eq or more, more preferably 300 g/eq or more, and for example, 1000 g/eq or less, preferably 600 g/eq or less.

These brominated epoxy compounds may be used alone or in combination of two or more.

The second epoxy component includes the above-described non-brominated epoxy compound, if necessary.

Then, in order to obtain the brominated epoxy resin, the second phenol component and the second epoxy component are reacted. Specifically, a brominated bisphenol compound, a brominated epoxy compound, a non-brominated bisphenol compound to be blended if necessary, and a non-brominated epoxy compound to be blended if necessary are blended to be reacted.

In the above-described reaction, the brominated bisphenol compound, the brominated epoxy compound, the non-brominated bisphenol compound to be blended if necessary, and the non-brominated epoxy compound to be blended if necessary are subjected to a chain extension reaction.

In addition, in the above-described reaction, a ratio of the second epoxy component is 0.5 equivalents or more, preferably 1.0 equivalent or more, preferably 2.0 equivalents or more, and for example, 4.0 equivalents or less with respect to 1 equivalent of the second phenol component.

In addition, in the above-described reaction, if necessary, the above-described catalyst can be added.

As a catalyst, preferably, a quaternary ammonium salt is used, more preferably, triethylbenzylammonium chloride is used.

A mixing ratio of the catalyst is, for example, 0.01 parts by mass or more, preferably 0.1 parts by mass or more, and for example, 3.0 parts by mass or less, preferably 1.0 part by mass or less with respect to 100 parts by mass of the total amount of the second phenol component and the second epoxy component.

In addition, in the above-described reaction, if necessary, a polymerization inhibitor (described later) (preferably, hydroquinone) can be added.

A mixing ratio of the polymerization inhibitor is, for example, 0.001 parts by mass or more, preferably 0.005 parts by mass or more, and for example, 0.5 parts by mass or less, preferably 0.1 parts by mass or less with respect to 100 parts by mass of the total amount of the second phenol component and the second epoxy component.

In addition, as reaction conditions, a reaction temperature is, for example, 80° C. or more, preferably 100° C. or more, and for example, 150° C. or less, preferably 130° C. or less, and the reaction time is, for example, 1 hour or more, preferably 3 hours or more, and for example, 12 hours or less, preferably 10 hours or less.

Thus, the brominated epoxy resin is obtained.

An epoxy equivalent of the brominated epoxy resin is, for example, 200 g/eq or more, preferably 300 g/eq or more, and for example, 800 g/eq or less, preferably 500 g/eq or less.

The bromine content of the brominated epoxy resin is, for example, 20% by mass or more, preferably 30% by mass or more, and for example, 60% by mass or less.

The bromine content of the brominated epoxy resin can be determined by an ion chromatography method.

Then, in order to obtain the brominated vinyl ester, the brominated epoxy resin and the above-described unsaturated monobasic acid (preferably, methacrylic acid) are reacted.

In the above-described reaction, the epoxy group of the brominated epoxy resin and the unsaturated monobasic acid are subjected to an addition reaction.

In addition, in the above-described reaction, an equivalent of the carboxyl group of the unsaturated monobasic acid to the epoxy group of the brominated epoxy resin is, for example, 0.5 or more, preferably 1.0 or more, and for example, 2.5 or less.

In addition, as reaction conditions, a reaction temperature is, for example, 80° C. or more, preferably 100° C. or more, and for example, 150° C. or less, preferably 130° C. or less, and the reaction time is, for example, 1 hour or more, preferably 2 hours or more, and for example, 10 hours or less, preferably 6 hours or less.

The above-described reaction can be also carried out following the reaction of the second phenol component and the second epoxy component described above.

Thus, the brominated vinyl ester is obtained.

An acid value of the brominated vinyl ester (measurement method: in conformity with JIS K6901 (2008)) is, for example, 5 mgKOH/g or more, and 20 mgKOH/g or less.

Then, the brominated vinyl ester resin is prepared by dissolving the brominated vinyl ester in the above-described polymerizable monomer (preferably, styrene).

The bromine content of the brominated vinyl ester resin is, for example, 10% by mass or more, preferably 20% by mass or more, and for example, 40% by mass or less.

The bromine content of the brominated vinyl ester resin can be determined by an ion chromatography method.

A mixing ratio of the other thermosetting resin is, for example, 5% by mass or more, and for example, 40% by mass or less with respect to the resin component.

The aluminum hydroxide is blended in order to impart the flame retardancy to a molded article (described later) obtained by using an unsaturated polyester resin composition, to impart transparency and depth, and in addition, to adjust a linear expansion coefficient of the molded article (described later).

An average particle size of the aluminum hydroxide is, for example, 1 μm or more, and for example, 50 μm or less, preferably 25 μm or less.

The average particle size of the aluminum hydroxide can be determined by preparing a particle size distribution curve with a laser diffraction-scattering particle size distribution measurement device and calculating the particle size corresponding to 50% by mass.

The aluminum hydroxide may be used alone or in combination of two or more of aluminum hydroxide having a different average particle size and aluminum hydroxide having different sodium oxide content.

A mixing ratio of the aluminum hydroxide is 50 parts by mass or more, preferably 100 parts by mass or more, more preferably 150 parts by mass or more, and 300 parts by mass or less, more preferably 200 parts by mass or less with respect to 100 parts by mass of the resin component.

When the mixing ratio of the aluminum hydroxide is increased, the flame retardancy is improved, while the linear expansion coefficient of the molded article (described later) obtained by using the unsaturated polyester resin composition becomes small, and when the mixing ratio of the aluminum hydroxide is decreased, the flame retardancy is decreased, while the linear expansion coefficient of the molded article (described later) obtained by using the unsaturated polyester resin composition becomes large.

Then, in the unsaturated polyester resin composition, when the molded article (described later) obtained by using the unsaturated polyester resin composition is used in combination with a light metal, the mixing ratio of the aluminum hydroxide is adjusted within the above-described range so that a difference from the linear expansion coefficient of the light metal becomes small from the viewpoint of improving the dimensional stability. Therefore, when the mixing ratio of the aluminum hydroxide is within the above-described range, the molded article (described later) obtained by using the unsaturated polyester resin composition has excellent dimensional stability, even when used in combination with the light metal (described later), while suppressing a decrease in the flame retardancy.

On the other hand, when the mixing ratio of the aluminum hydroxide is below the above-described lower limit, the flame retardancy is excessively decreased in the molded article (described later) obtained by using the unsaturated polyester resin composition.

In addition, when the mixing ratio of the aluminum hydroxide is above the above-described upper limit, the dimensional stability of the molded article (described later) obtained by using the unsaturated polyester resin composition is decreased when used in combination with the light metal (described later).

The electrically conductive filler is blended in order to impart the electromagnetic shielding properties to the molded article (described later) obtained by using the unsaturated polyester resin composition.

Examples of the electrically conductive filler include electrically conductive fibers, electrically conductive particles, and carbon nanotubes.

Examples of the electrically conductive fiber include carbon fibers such as PAN-based carbon fibers and pitch-based carbon fibers.

When the electrically conductive filler includes the electrically conductive fibers, the molded article (described later) obtained by using the unsaturated polyester resin composition has excellent electromagnetic shielding properties.

A fiber length of the electrically conductive fiber is, for example, 0.01 mm or more, and for example, 5 mm or less.

The electrically conductive fibers may be used alone or in combination of two or more kinds of electrically conductive fibers having a different fiber length.

The electrically conductive fiber preferably includes an electrically conductive fiber having a fiber length of at least 0.01 mm or more and 0.15 mm or less (hereinafter, referred to as an electrically conductive short fiber).

When the electrically conductive fiber includes the electrically conductive short fiber, a mixing ratio of the electrically conductive short fiber is, for example, 5% by mass or more, preferably 12% by mass or more, and for example, 70% by mass or less, preferably 58% by mass or less, more preferably 50% by mass or less, further more preferably 20% by mass or less with respect to the electrically conductive fiber.

When the mixing ratio of the electrically conductive short fiber is the above-described lower limit or more, the molded article (described later) obtained by using the unsaturated polyester resin composition has excellent electromagnetic shielding properties.

When the mixing ratio of the electrically conductive short fiber is the above-described upper limit or less, the molded article (described later) obtained by using the unsaturated polyester resin composition has excellent electromagnetic shielding properties.

Further, the electrically conductive fiber preferably includes an electrically conductive fiber having a fiber length of at least 1.5 mm or more and 5 mm or less (hereinafter, referred to as an electrically conductive long fiber).

In addition, when the electrically conductive fiber includes the electrically conductive long fiber, a mixing ratio of the electrically conductive long fiber is, for example, 10% by mass or more, and for example, 30% by mass or less, preferably 20% by mass or less with respect to the electrically conductive fiber.

When the mixing ratio of the electrically conductive long fiber is within the above-described range, the molded article (described later) obtained by using the unsaturated polyester resin composition has excellent electromagnetic shielding properties.

The electrically conductive fiber can also include an electrically conductive fiber having a fiber length of above 0.15 mm and below 1.5 mm (hereinafter, referred to as an electrically conductive medium fiber).

When the electrically conductive fiber includes the electrically conductive medium fiber, a mixing ratio of the electrically conductive medium fiber is, for example, 20% by mass or more, preferably 50% by mass or more, and for example, 90% by mass or less, preferably 80% by mass or less with respect to the electrically conductive fiber.

More preferably, the electrically conductive fibers are used in combination of two kinds or more to differ in fiber length distribution from the view point of optimizing the fiber length distribution in order to develop the electromagnetic shielding properties.

Specifically, two or more kinds selected from the group consisting of electrically conductive short fibers, electrically conductive medium fibers, and electrically conductive long fibers are used in combination. Preferably, the electrically conductive fiber includes the electrically conductive short fiber, and the electrically conductive medium fiber and/or the electrically conductive long fiber. Hereinafter, the electrically conductive medium fiber and/or the electrically conductive long fiber are/is referred to as an electrically conductive medium long fiber.

When the electrically conductive fiber includes the electrically conductive short fiber and the electrically conductive medium long fiber, in the molded article (described later) obtained by using the unsaturated polyester resin composition, the electrically conductive short fiber is dispersed in the molded article (described later), and the electrically conductive medium long fiber forms a layer capable of blocking the electromagnetic waves. As a result, the molded article (described later) has excellent electromagnetic shielding properties.

When the electrically conductive fiber includes the electrically conductive short fiber and the electrically conductive medium long fiber, a mixing ratio of the electrically conductive short fiber is, for example, 5% by mass or more, preferably 12% by mass or more, and for example, 70% by mass or less, preferably 58% by mass or less, more preferably 50% by mass or less, further more preferably 20% by mass or less.

When the mixing ratio of the electrically conductive short fiber is the above-described lower limit or more, the molded article (described later) obtained by using the unsaturated polyester resin composition has excellent electromagnetic shielding properties.

When the mixing ratio of the electrically conductive short fiber is the above-described upper limit or less, the molded article (described later) obtained by using the unsaturated polyester resin composition has excellent electromagnetic shielding properties.

A mixing ratio of the electrically conductive medium long fiber is, for example, 30% by mass or more, preferably 42% by mass or more, more preferably 50% by mass or more, further more preferably 80% by mass or more, and for example, 95% by mass or less, preferably 88% by mass or less with respect to the electrically conductive fiber.

A mixing ratio of the electrically conductive medium long fiber is, for example, 50 parts by mass or more, preferably 70 parts by mass or more, more preferably 300 parts by mass or more, further more preferably 500 parts by mass or more, and for example, 1000 parts by mass or less, preferably 700 parts by mass or less with respect to 100 parts by mass of the electrically conductive short fiber.

The electrically conductive fiber further more preferably includes the electrically conductive short fiber, the electrically conductive medium fiber, and the electrically conductive long fiber, and particularly preferably consists of the electrically conductive short fiber, the electrically conductive medium fiber, and the electrically conductive long fiber.

When the electrically conductive fiber includes the electrically conductive short fiber, the electrically conductive medium fiber, and the electrically conductive long fiber, the molded article (described later) obtained by using the unsaturated polyester resin composition has excellent electromagnetic shielding properties.

When the electrically conductive fiber includes the electrically conductive short fiber, the electrically conductive medium fiber, and the electrically conductive long fiber, a mixing ratio of the electrically conductive short fiber is, for example, 5% by mass or more, preferably 12% by mass or more, and, for example, 70% by mass or less, preferably 58% by mass or less, more preferably 50% by mass or less, further more preferably 20% by mass or less with respect to the electrically conductive fiber.

When the electrically conductive fiber includes the electrically conductive short fiber, the electrically conductive medium fiber, and the electrically conductive long fiber, a mixing ratio of the electrically conductive medium fiber is, for example, 70% by mass or more, and for example, 90% by mass or less with respect to the electrically conductive medium long fiber, and is, for example, 20% by mass or more, preferably 50% by mass or more, and for example, 90% by mass or less, preferably 80% by mass or less with respect to the electrically conductive fiber.

When the electrically conductive fiber includes the electrically conductive short fiber, the electrically conductive medium fiber, and the electrically conductive long fiber, a mixing ratio of the electrically conductive long fiber is, for example, 15% by mass or more, and for example, 30% by mass or less with respect to the electrically conductive medium long fiber, and is, for example, 10% by mass or more, and for example, 30% by mass or less, preferably 20% by mass or less with respect to the electrically conductive fiber.

Further, a mixing ratio of the electrically conductive long fiber is, for example, 10 parts by mass or more, preferably 20 parts by mass or more, and for example, 50 parts by mass or less with respect to 100 parts by mass of the electrically conductive medium fiber.

When the electrically conductive fiber includes the electrically conductive short fiber, the electrically conductive medium fiber, and the electrically conductive long fiber, and the mixing ratio of the electrically conductive long fiber is within the above-described range, a layer capable of blocking the electromagnetic waves acts more effectively, and as a result, the molded article (described later) obtained by using the unsaturated polyester resin composition has more excellent electromagnetic shielding properties.

A mixing ratio of the electrically conductive fiber is, for example, 1 part by mass or more, preferably 8 parts by mass or more, more preferably 13 parts by mass or more, and for example, 25 parts by mass or less, preferably 21 parts by mass or less with respect to 100 parts by mass of the resin component.

When the mixing ratio of the electrically conductive fiber is the above-described lower limit or more, the molded article (described later) obtained by using the unsaturated polyester resin composition has excellent electromagnetic shielding properties.

When the mixing ratio of the electrically conductive fiber is the above-described upper limit or less, it is possible to sufficiently impregnate the reinforcing fiber into the unsaturated polyester resin composition, and the production stability is excellent.

Examples of the electrically conductive particles include metal particles such as copper, gold, silver, and nickel, and carbon particles such as carbon black, and preferably, carbon particles are used, more preferably, carbon black is used.

When the electrically conductive filler includes the electrically conductive particles, the molded article (described later) obtained by using the unsaturated polyester resin composition has excellent electromagnetic shielding properties.

A mixing ratio of the electrically conductive particles is, for example, 1 part by mass or more, preferably 1.5 parts by mass or more, more preferably 2 parts by mass or more, and for example, 5 parts by mass or less with respect to 100 parts by mass of the resin component.

When the mixing ratio of the electrically conductive particles is within the above-described range, the molded article (described later) obtained by using the unsaturated polyester resin composition has excellent electromagnetic shielding properties.

These electrically conductive particles may be used alone or in combination of two or more.

As the carbon nanotube, for example, those described in the NEDO report of all about carbon nanotubes (published in Dec. 26, 2016, edited by New Energy and Industrial Technology Development Organization, the Nikkan Kogyo Shimbun, Ltd.) can be illustrated. The carbon nanotube is a tube-cylindrical material whose diameter consisting of only carbon is nanometer-sized and is not particularly limited. Examples thereof include known various carbon nanotubes. Specifically, examples thereof include single-walled carbon nanotubes (SWCNT) in which a cylinder is one layer, and multi-walled carbon nanotubes (MWCNT) in which a plurality of carbon nanotubes (CNTs) having different diameters are coaxially overlapped and formed in several layers.

An average diameter of the single-walled carbon nanotube (SWCNT) is, for example, 0.8 nm or more, and for example, 3 nm or less, and an average length thereof is, for example, 1 μm or more, and for example, 5 mm or less.

Further, an average diameter of the multi-walled carbon nanotube (MWCNT) is, for example, 10 nm or more, and for example, 40 nm or less, and an average length thereof is, for example, 1 μm or more, and for example, 10 mm or less.

When the electrically conductive filler includes the carbon nanotube, the molded article (described later) obtained by using the unsaturated polyester resin composition has excellent electromagnetic shielding properties.

A mixing ratio of the carbon nanotube is, for example, 0.1 parts by mass or more, and for example, 1 part by mass or less, preferably 0.5 parts by mass or less with respect to 100 parts by mass of the resin component.

These carbon nanotubes may be used alone or in combination of two or more.

These electrically conductive fillers may be used alone or in combination of two or more, and preferably, electrically conductive fiber and carbon nanotube are used in combination, and electrically conductive fiber and electrically conductive particles are used in combination, more preferably, electrically conductive fiber and carbon nanotube are used in combination.

When the electrically conductive fiber and the electrically conductive particles are used in combination, a mixing ratio of the electrically conductive fiber is, for example, 50 parts by mass or more, preferably 70 parts by mass or more, and for example, 90 parts by mass or less with respect to 100 parts by mass of the total amount of the electrically conductive fiber and the electrically conductive particles, and a mixing ratio of the electrically conductive particles is, for example, 10 parts by mass or more, and for example, 50 parts by mass or less, preferably 30 parts by mass or less with respect to 100 parts by mass of the total amount of the electrically conductive fiber and the electrically conductive particles.

When the electrically conductive fiber and the carbon nanotube are used in combination, a mixing ratio of the electrically conductive fiber is, for example, 70 parts by mass or more, and for example, 99 parts by mass or less with respect to 100 parts by mass of the total amount of the electrically conductive fiber and the carbon nanotube, and a mixing ratio of the carbon nanotube is, for example, 0.1 parts by mass or more, and for example, 1 part by mass or less with respect to 100 parts by mass of the total amount of the electrically conductive fiber and the carbon nanotube.

When the electrically conductive fiber and the carbon nanotube are used in combination as an electrically conductive filler, the molded article (described later) obtained by using the unsaturated polyester resin composition has excellent electromagnetic shielding properties.

A mixing ratio of the electrically conductive filler is, for example, 1 part by mass or more, preferably 3 parts by mass or more, preferably 8 parts by mass or more, more preferably 12 parts by mass or more, and for example, 30 parts by mass or less, preferably 25 parts by mass or less with respect to 100 parts by mass of the resin component.

When the mixing ratio of the electrically conductive filler is the above-described lower limit or more, the molded article (described later) obtained by using the unsaturated polyester resin composition has excellent electromagnetic shielding properties.

When the mixing ratio of the electrically conductive filler is the above-described upper limit or less, it is possible to sufficiently impregnate the reinforcing fiber into the unsaturated polyester resin composition, and the production stability is excellent.

Then, the unsaturated polyester resin composition can be obtained by blending the resin component (unsaturated polyester, polymerizable monomer, low shrinkage agent, and another thermosetting resin to be blended if necessary), the aluminum hydroxide, and the electrically conductive filler at the above-described mixing ratio.

Thus, the unsaturated polyester resin composition is obtained.

In the unsaturated polyester resin composition, a mixing ratio of the resin component is, for example, 20% by mass or more, preferably 30% by mass or more, and for example, 60 parts by mass or less with respect to the unsaturated polyester resin composition. Further, a mixing ratio of the aluminum hydroxide is 40% by mass or more, preferably 50% by mass or more, and for example, 70 parts by mass or less with respect to the unsaturated polyester resin composition. Further, a mixing ratio of the electrically conductive filler is, for example, 0.1% by mass or more, preferably 2% by mass or more, more preferably 4% by mass or more, and for example, 20% by mass or less, preferably 10% by mass or less. Further, the total amount of the resin component, the aluminum hydroxide, and the electrically conductive filler is, for example, 85% by mass or more, preferably 95% by mass or more, and for example, 100% by mass or less with respect to the unsaturated polyester resin composition.

Further, if necessary, additives such as a flame retardant, a polymerization inhibitor, a curing agent, a release agent, a colorant, a filler, and a thickener may be blended into the unsaturated polyester resin composition. These additives may be used alone or in combination of two or more.

The flame retardant is blended in order to impart the flame retardancy to the molded article (described later) obtained by using the unsaturated polyester resin composition.

Examples of the flame retardant include halogen flame retardants such as a bromine-based flame retardant, and non-halogen flame retardants such as a phosphorus-based flame retardant, an inorganic flame retardant, and a nitrogen compound-based flame retardant.

Examples of the bromine-based flame retardant include hexabromobenzene; tetrabromobisphenol; bromodiphenyl such as tetrabromodiphenyl, hexabromodiphenyl, decabromodiphenyl, and decabromodiphenyl ethane (bispentabromophenylethane); and bromodiphenyl ethers such as tetrabromodiphenyl ether, hexabromodiphenyl ether, and decabromodiphenyl ether.

Examples of the phosphorus-based flame retardant include red phosphorus; phosphate esters such as trimethyl phosphate, triethyl phosphate, tributyl phosphate, and tricresyl phosphate; polyphosphates such as ammonium polyphosphate; IFR (Intumescent)-based expansion-type flame retardants obtained by blending an auxiliary agent such as ammonium polyphosphate and pentaerythritol with a carbon supply agent such as melamine; and phosphinic metal salts.

Further, as the phosphorus-based flame retardant, a commercially available product can be used, and specifically, examples thereof include the Exolit AP series (specifically, Exolit AP422 (ammonium polyphosphate)), the OP series (specifically, Exolit OP1230 (phosphinic acid metal salt)), the RP series (manufactured by Clariant Japan K.K.), and the FP series (specifically, the FP-2500S phosphorus-based) (manufactured by ADEKA CORPORATION).

Examples of the inorganic flame retardant include antimony oxide such as antimony trioxide, zinc stannate, zinc borate and a preparation thereof.

Examples of the nitrogen compound-based flame retardant include an azoalkane compound, a hindered amine compound, and a melamine compound.

As the flame retardant, preferably, a non-halogen-based flame retardant is used.

That is, preferably, the unsaturated polyester resin composition is substantially free of a halogen-based flame retardant.

Substantially free of the halogen-based flame retardant means that a ratio of the halogen-based flame retardant is, for example, 1.0% by mass or less, preferably 0.1% by mass or less with respect to the unsaturated polyester resin composition.

When the unsaturated polyester resin composition is substantially free of the halogen-based flame retardant, generation of a gas derived from halogen can be suppressed during burning, and environmental pollution can be suppressed.

Further, as the flame retardant, more preferably, a phosphorus-based flame retardant is used, further more preferably, a phosphate ester is used, particularly preferably, an ammonium polyphosphate and a phosphinic acid metal salt are used.

A mixing ratio of the flame retardant is, for example, 5 parts by mass or more, preferably 15 parts by mass or more, and for example, 100 parts by mass or less, preferably 50 parts by mass or less with respect to 100 parts by mass of the resin component.

Further, a mixing ratio of the flame retardant is, for example, 5 parts by mass or more, more preferably 13 parts by mass or more, and for example, 80 parts by mass or less, preferably 50 parts by mass or less with respect to 100 parts by mass of the aluminum hydroxide.

These flame retardants may be used alone or in combination of two or more.

The polymerization inhibitor is blended in order to adjust a pot life and a curing reaction, and examples thereof include hydroquinone compounds such as hydroquinone, methylhydroquinone, and t-butylhydroquinone; benzoquinone compounds such as p-benzoquinone and methyl-p-benzoquinone; catechol compounds such as t-butylcatechol; phenol compounds such as 2,6-di-t-butyl-4-methylphenol and 4-methoxyphenol; and N-oxyl compounds such as 1-oxyl-2,2,6,6-tetramethylpiperidine, 1-oxyl-2,2,6,6-tetramethylpiperidine-4-ol, 4-hydroxy-2,2,6,6-tetrapiperidine-1-oxyl, 4-methoxy-2,2,6,6-tetramethylpiperidine-1-oxyl, 1-oxyl-2,2,6,6-tetramethylpiperidine-4-yl-acetate, 1-oxyl-2,2,6,6-tetramethylpiperidine-4-yl-2-ethylhexanoate, 1-oxyl-2,2,6,6- tetramethylpiperidine-4-yl-stearate, 1-oxyl-2,2,6,6-tetramethylpiperidine-4-yl-4-t-butylbenzoate, bis(1-oxyl-2,2,6,6-tetramethylpiperidine-4-yl) succinate ester, bis(1-oxyl-2,2,6,6-tetramethylpiperidine-4-yl) adipic acid ester, bis(1-oxyl-2,2,6,6-tetramethylpiperidine-4-yl) sebacate, bis (1-oxyl-2,2,6,6-tetramethylpiperidine-4-yl) n-butylmalonic acid ester, bis(1-oxyl-2,2,6,6-tetramethylpiperidine-4-yl) phthalate, bis(1-oxyl-2,2,6,6-tetramethylpiperidine-4-yl) isophthalate, bis(1-oxyl-2,2,6,6-tetramethylpiperidine-4-yl) terephthalate, bis(1-oxyl-2,2,6,6-tetramethylpiperidine-4-yl) hexahydroterephthalate, N,N'-bis(1-oxyl-2,2,6,6-tetramethylpiperidine-4-yl) adipamide, N-bis(1-oxyl-2,2,6,6-tetramethylpiperidine-4-yl) caprolactam, N-bis(1-oxyl-2,2,6,6-tetramethylpiperidine-4-yl) dodecyl succinimide, 2,4,6-tris-[N-butyl-N-(1-oxyl-2,2,6,6-tetramethylpiperidine-4-yl)]-s-triazine, and 1-oxyl-2,2,6,6-tetramethylpiperidine-4-one. Preferably, a benzoquinone compound is used, more preferably, a p-benzoquinone is used.

A mixing ratio of the polymerization inhibitor is, for example, 0.01 parts by mass or more, and for example, 0.1 parts by mass or less with respect to 100 parts by mass of the resin component.

These polymerization inhibitors may be used alone or in combination of two or more.

Examples of the curing agent include peroxides such as benzoyl peroxide, t-butyl peroxyisopropyl monocarbonate, t-amyl peroxyisopropyl monocarbonate, t-hexyl peroxyisopropyl monocarbonate, 1,1-bis(t-butyl peroxy)cyclohexane, t-butyl peroxy-2-ethylhexanoate, amylperoxy-2-ethylhexanoate, 2-ethylhexylperoxy-2-ethylhexanoate, t-butyl peroxybenzoate, t-hexyl peroxybenzoate, and t-hexyl peroxyacetate, and preferably, t-butyl peroxyisopropyl monocarbonate which is peroxyisopropyl monocarbonate, t-amyl peroxyisopropyl monocarbonate, t-hexyl peroxyisopropyl monocarbonate, and t-butyl peroxybenzoate are used.

A mixing ratio of the curing agent is, for example, 0.5 parts by mass or more, preferably 0.8 parts by mass or more, and for example, 10 parts by mass or less, preferably 3 parts by mass or less with respect to 100 parts by mass of the resin component.

These curing agents may be used alone or in combination of two or more.

Examples of the release agent include fatty acids such as stearic acid and lauric acid, fatty acid metal salts such as zinc stearate and calcium stearate, paraffins, liquid wax, fluorine polymers, and silicon-based polymers, and preferably, fatty acid metal salt is used, more preferably, zinc stearate is used.

Further, as a release agent, for example, a mixture of a surfactant such as fatty acid alkyl ester and alkylammonium salt and a copolymer can be also used. As such a release agent, a commercially available product can be used, and specifically, BYK-P 9051, BYK-P 9060, BYK-P 9080 (manufactured by BYK Japan K.K.) and the like are used.

A mixing ratio of the release agent is, for example, 1 part by mass or more, preferably 3 parts by mass or more, and for example, 10 parts by mass or less with respect to 100 parts by mass of the resin component.

These release agents may be used alone or in combination of two or more.

The colorant is not particularly limited, and examples thereof include titanium oxide and polyester toner (titanium oxide and/or carbon black-containing polyester colorant).

A mixing ratio of the colorant is, for example, 1 part by mass or more, preferably 3 parts by mass or more, and for example, 20 parts by mass or less with respect to 100 parts by mass of the resin component.

These colorants may be used alone or in combination of two or more.

Examples of the filler include inorganic fillers including oxides such as alumina and titania; hydroxides such as magnesium hydroxide (excluding aluminum hydroxide); carbonates such as calcium carbonate; sulfates such as barium sulfate; silica (for example, crystalline silica, fused silica, fumed silica, dry silica (aerogel), and the like); glass powders; hollow fillers such as glass balloon, silica balloon, and alumina balloon; silicates such as silica sand, diatomaceous earth, mica, clay, kaolin, and talc; fluorides such as fluorite; phosphates such as calcium phosphate; and clay minerals such as smectite.

A mixing ratio of the filler is, for example, 1 part by mass or more, preferably 3 parts by mass or more, and for example, 50 parts by mass or less, preferably 30 parts by mass or less with respect to 100 parts by mass of the resin component.

These fillers may be used alone or in combination of two or more.

The viscosity reducing agent is blended in order to decrease the unsaturated polyester resin composition to have the viscosity suitable for heat compression molding, and examples thereof include known viscosity reducing agents such as phosphoric acid polyester. In addition, a commercially available product can be used as the viscosity reducing agent, and specifically, an example thereof includes BYK-W996 (manufactured by BYK Japan K.K.).

A mixing ratio of the viscosity reducing agent is, for example, 0.1 parts by mass or more, and for example, 10 parts by mass or less with respect to 100 parts by mass of the resin component.

These viscosity reducing agents may be used alone or in combination of two or more.

The thickener is blended in order to thicken the unsaturated polyester resin composition to have the viscosity suitable for heat compression molding, and is preferably blended before (preferably, immediately before) impregnating the unsaturated polyester resin composition into the reinforcing fiber (described later). Examples thereof include alkaline earth metal oxides such as magnesium oxide, and alkaline earth metal hydroxides such as magnesium hydroxide and calcium hydroxide, and preferably, alkaline earth metal oxide is used, more preferably, magnesium oxide is used.

A mixing ratio of the thickener is, for example, 0.5 parts by mass or more, and for example, 10 parts by mass or less, preferably 3 parts by mass or less with respect to 100 parts by mass of the resin component.

These thickeners may be used alone or in combination of two or more.

Further, if necessary, an additive may be blended into the unsaturated polyester resin composition as long as it does not damage the effect of the present invention. Examples of the additive include handle materials, antibacterial agents, hydrophilic agents, photocatalysts, ultraviolet absorbers, ultraviolet stabilizers, separation inhibitors, silane coupling agents, antistatic agents, thixotropic agents, thixo stabilizers, and polymerization accelerators. These additives may be used alone or in combination of two or more.

In the above-described description, the resin component, the aluminum hydroxide, the electrically conductive filler, and the additive to be blended if necessary are blended to obtain the unsaturated polyester resin composition. Alternatively, the unsaturated polyester resin is prepared by first dissolving the unsaturated polyester in the polymerizable monomer, and then, the obtained unsaturated polyester resin, the polymerizable monomer, the low shrinkage agent, another thermosetting resin to be blended if necessary, the aluminum hydroxide, the electrically conductive filler, and the additive to be blended if necessary can be also blended.

In the preparation of the unsaturated polyester resin, the unsaturated polyester and the polymerizable monomer are blended, and if necessary, the above-described additive (for example, the polymerization inhibitor) may be also appropriately blended.

In the preparation of the unsaturated polyester resin, a mixing ratio of the polymerizable monomer is, for example, 35 parts by mass or more, and for example, 150 parts by mass or less with respect to 100 parts by mass of the unsaturated polyester, and a mixing ratio of the polymerization inhibitor is, for example, 0.001 parts by mass or more, preferably 0.005 parts by mass or more, and for example, 0.1 parts by mass or less, preferably 0.05 parts by mass or less, with respect to 100 parts by mass of the unsaturated polyester.

Then, the molding material can be prepared by blending known reinforcing fibers such as glass fiber into the unsaturated polyester resin composition. Then, the molded article can be obtained from the molding material by a known method.

Examples of the reinforcing fiber include inorganic fibers such as glass fiber, carbon fiber, metal fiber, and ceramic fiber; organic fibers such as polyvinyl alcohol-based fiber, polyester-based fiber, polyamide-based fiber, fluororesin-based fiber, and phenol-based fiber; and natural fibers such as hemp and kenaf, and preferably, an inorganic fiber is used, more preferably, a carbon fiber and a glass fiber are used, further more preferably, a glass fiber is used.

Examples of a shape of the reinforcing fiber include cloth shapes such as a roving cloth, mat shapes such as a chopped strand mat, a performable mat, a continuous strand mat, and a surfacing mat, strand shapes, roving shapes, nonwoven fabric shapes, and paper shapes, and preferably, a roving shape is used.

Of these reinforcing fibers, preferably, a carbon fiber and a glass fiber are used, more preferably, a glass fiber is used, more specifically, a glass roving is preferable, further more specifically, a glass chop obtained by cutting the glass roving at a predetermined length is preferable.

A length of the reinforcing fiber is not particularly limited, and is, for example, 1.5 mm or more. In a case where the molding material is prepared by using the above-described unsaturated polyester resin composition, since the smoothness can be secured even when the reinforcing fiber is long, from the viewpoint of improving the strength, the length of the reinforcing fiber is preferably 5 mm or more, more preferably 15 mm or more, and for example, 80 mm or less, preferably 40 mm or less.

Then, the molding material is, for example, obtained as a sheet-shaped molding material by impregnating the unsaturated polyester resin composition into the reinforcing fiber.

A mixing ratio of the reinforcing fiber (for example, when the reinforcing fiber is the glass fiber, hereinafter, referred to as a glass content ratio) is, for example, 5% by mass or more, preferably 10% by mass or more, and for example, 50% by mass or less, preferably 35% by mass or less with respect to the total amount of the unsaturated polyester resin composition and the reinforcing fiber.

Examples of a method for preparing the molding material include known methods such as SMC (sheet molding compound), TMC (thick molding compound), and BMC (bulk molding compound), and preferably, from the viewpoint of improving the strength of the molded article, the SMC and the TMC suitable as the method for preparing the molding material blended with a long reinforcing fiber (for example, 5 mm or more) are used.

Thus, the molding material including the above-described unsaturated polyester resin composition and the reinforcing fiber is obtained.

The total amount (volume content ratio) of a filler-excluding component obtained by excluding the aluminum hydroxide, the electrically conductive filler, and the filler to be blended if necessary of the above-described unsaturated polyester resin composition (specifically, the total amount of the other additives other than the unsaturated polyester, the polymerizable monomer, the low shrinkage agent, and the filler to be blended if necessary) is, for example, 30% by volume or more, preferably 40% by volume or more, and for example, 70% by volume or less, preferably 50% by volume or less with respect to the molding material.

When the volume content ratio of the filler-excluding component is the above-described lower limit or more and the above-described upper limit or less, it is possible to sufficiently impregnate the reinforcing fiber into the unsaturated polyester resin composition, and the production stability is excellent.

Further, the volume content ratio of the aluminum hydroxide is, for example, 10% by volume or more, preferably 28% by volume or more, and for example, 40% by volume or less, preferably 35% by volume or less with respect to the molding material.

Further, the volume content ratio of the reinforcing fiber is, for example, 15% by volume or more, and for example, 40% by volume or less, preferably 30% by volume or less with respect to the molding material.

Since the molding material includes the above-described unsaturated polyester resin composition, the molded article obtained by using the molding material has excellent low shrinkage and flame retardancy, has excellent electromagnetic shielding properties, and has excellent dimensional stability even when used in combination with a light metal.

Next, preferably, the molding material is matured at, for example, 20° C. or more and 50° C. or less for 8 hours or more and 120 hours or less to thicken the viscosity so as to be capable of heat compression molding (described later).

This allows the molding material to be retained in, for example, a sheet shape. That is, the molding material has a sheet shape.

Then, the molded article is obtained by heat compression molding of the molding material by a known method.

The conditions of the heat compression molding are appropriately set in accordance with the purpose and application, and specifically, a molding temperature is, for example, 100° C. or more, and for example, 200° C. or less, and the molding pressure is, for example, 0.1 MPa or more, preferably 1 MPa or more, more preferably 5 MPa or more, and for example, 20 MPa or less, preferably 15 MPa or less.

Thus, the molding material is molded, while being cured.

Thus, the molded article is obtained.

Since the molded article includes a cured product of the above-described molding material, it has excellent low shrinkage and flame retardancy, and has excellent electromagnetic shielding properties.

In addition, in the above-described unsaturated polyester resin composition, the polybasic acid includes the ethylenically unsaturated bond-containing polybasic acid at the above-described predetermined ratio. In addition, the above-described unsaturated polyester resin composition includes the polyvinyl acetate at the above-described predetermined ratio. In addition, the inclusion of the aluminum hydroxide at the above-described predetermined ratio can approximate the linear expansion coefficient of light metals such as aluminum (linear expansion coefficient of 23.0 ppm/° C.) and magnesium (linear expansion coefficient of 25.4 ppm/° C.), thereby improving the dimensional stability of the molded article.

Specifically, the linear expansion coefficient of the above-described molded article is, for example, 17.0 ppm/° C. or more, preferably 18.5 ppm/° C. or more, more preferably 19.0 ppm/° C. or more, and for example, 30.0 ppm/° C. or less, preferably 25.0 ppm/° C. or less, more preferably 20.0 ppm/° C. or less.

Also, when the light metal is the aluminum, an absolute value of a difference (linear expansion coefficient of the aluminum-linear expansion coefficient of the molded article) between the linear expansion coefficient of the molded article and the linear expansion coefficient of the aluminum is, for example, 7 or less, preferably 6 or less, more preferably 4.5 or less, further more preferably 4 or less.

Therefore, even when the molded article is used in combination with the light metal, it has excellent dimensional stability.

On the other hand, the linear expansion coefficient of the molded article made of the molding material including the calcium carbonate as in Patent Document 1 is 0 ppm/° C. or more and 16 ppm/° C. or less, and a difference from a light metal (for example, aluminum (linear expansion coefficient of 23.0 ppm/° C.)) is large. Therefore, when the molded article is used in combination with the light metal, there are such problems as a change of a gap between components and the stress generation at the junction due to a dimensional difference by the thermal change, and poor dimensional stability such as a decrease in the sealing properties at a sealed portion.

Examples of the light metal include aluminum and magnesium, and preferably, aluminum is used.

A method for measuring the linear expansion coefficient of the molded article is described in detail in Examples to be described later.

Further, the above-described unsaturated polyester resin composition includes the electrically conductive filler.

Therefore, the molded article obtained by using the unsaturated polyester resin composition has excellent electromagnetic shielding properties.

The molded article is preferably used in a battery pack casing for an electric vehicle, and more preferably in a lithium battery pack casing for an electric vehicle.

In a case where the molded article is used in the lithium battery pack casing for an electric vehicle, when a battery is housed in the battery pack casing for an electric vehicle, electromagnetic waves may be radiated from the battery.

The electromagnetic waves may affect the human body.

On the other hand, the battery pack casing for an electric vehicle is obtained by using the above-described molded article, it has excellent electromagnetic shielding properties. Therefore, the above-described electromagnetic waves can be blocked.

As shown in FIG. 1, a battery pack casing 1 for an electric vehicle includes a tray member 2 as one example of an aluminum member, and a cover member 3 used in combination with the tray member 2 and made of the above-described molded article.

The tray member 2 is a vessel that houses a battery (not shown) and has a box shape with one side opened. The tray member 2 is made of aluminum.

The cover member 3 has a plate shape that closes an opening provided in the tray member 2, and has the same size as the opening.

Figure 2:
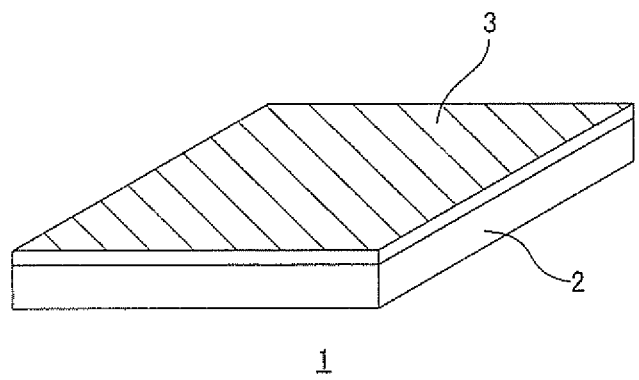
FIG. 2 shows a schematic perspective view when a tray member and a cover member are used in combination in the battery pack casing for an electric vehicle of FIG. 1.

Then, in the battery pack casing 1 for an electric vehicle, as shown in FIG. 2, the tray member 2 and the cover member 3 are used in combination so that the cover member 3 closes the opening provided in the tray member 2.

That is, in the battery pack casing 1 for an electric vehicle, the molded article is used in combination with an aluminum member.

Then, as described above, the difference between the linear expansion coefficient of the molded article and the linear expansion coefficient of the aluminum is small, so that the battery pack casing 1 for an electric vehicle has excellent dimensional stability.

Further, since the battery pack casing 1 for an electric vehicle includes the cover member 3 made of the above-described molded article, it has excellent low shrinkage and electromagnetic shielding properties.

EXAMPLES

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS". All designations of "part" or "parts" and "%" mean part or parts by mass and % by mass, respectively, unless otherwise particularly specified in the following description.

1. Details of Components

Each of the components used in Examples and Comparative Examples is described below.

Polyvinyl acetate solution: 40% styrene solution of polyvinyl acetate

Polystyrene solution: 35% styrene solution of polystyrene having a weight average molecular weight of about 250000

Polyethylene powder: polyethylene powder having an average particle size of about 30 µm VULCAN XC72: carbon black, manufactured by Cabot Corporation SWCNT: single-walled carbon nanotube ECP: Ketjenblack, manufactured by Lion Specialty Chemicals Co., Ltd.

DONACARBO Milled S-241: pitch-based carbon fiber milled fiber, average fiber length of 0.14 mm, electrically conductive short fiber of 55% by mass, electrically conductive medium long fiber of 45% by mass (specifically, electrically conductive medium fiber of 45% by mass, electrically conductive long fiber of 0% by mass), manufactured by Osaka Gas Chemicals Co., Ltd.

DONACARBO Milled S-244: pitch-based carbon fiber milled fiber, average fiber length of 0.68 mm, electrically conductive short fiber of 10% by mass, electrically conductive medium long fiber of 90% by mass (specifically, electrically conductive medium fiber of 90% by mass, electrically conductive long fiber of 0% by mass)

CFMP-150R: PAN-based carbon fiber milled fiber, average fiber length of 0.15 mm, electrically conductive short fiber of 15% by mass, electrically conductive medium long fiber of 85% by mass (specifically, electrically conductive medium fiber of 70% by mass, electrically conductive long fiber of 15% by mass), manufactured by Nippon Polymer Sangyo Co., Ltd.

150RE-P: PAN-based carbon-fiber milled fiber, average fiber length of 0.10 mm, electrically conductive short fiber of 60% by mass, electrically conductive medium long fiber of 40% by mass (specifically, electrically conductive medium fiber of 40% by mass, electrically conductive long fiber of 0% by mass), manufactured by Nippon Polymer Sangyo Co., Ltd.

Calcium carbonate: average particle size of about 3 μm

PERBUTYL I-75: t-butyl peroxyisopropyl carbonate, manufactured by NOF CORPORATION BYK-W996: viscosity reducing agent, manufactured by BYK Japan K.K.

BYK-P 9060: release agent, manufactured by BYK Japan K.K.

AP422: flame retardant; ammonium polyphosphate, trade name: Exolit AP422, manufactured by Clariant Plastics & Coatings (Japan) K.K., phosphorus content of 31%

FP-2500S: flame retardant, phosphate-based, manufactured by ADEKA CORPORATION

OP1230: flame retardant, phosphinic acid metal salt, trade name: Exolit OP1230, manufactured by Clariant Plastics & Coatings (Japan) K.K., phosphorus content of 23%

2. Preparation of Unsaturated Polyester Resin

Synthesis Example 1

A flask equipped with a thermometer, a nitrogen gas introduction pipe, a reflux condenser, and a stirrer was charged with 10.0 mol of maleic anhydride, 6.5 mol of propylene glycol, and 4.0 mol of neopentyl glycol, and subjected to a polycondensation reaction at 200° C. to 210° C. while stirring under a nitrogen gas atmosphere to obtain an unsaturated polyester having an acid value of 26.5 mgKOH/g. A method for measuring the acid value was in conformity with JIS K6901 (2008). As a polymerization inhibitor, 0.01 parts by mass of hydroquinone and 66.7 parts by mass of styrene were added to 100 parts by mass of the obtained unsaturated polyester, and they were uniformly mixed to obtain an unsaturated polyester resin (styrene content of 40%).

Synthesis Example 2

A flask equipped with a thermometer, a nitrogen gas introduction pipe, a reflux condenser, and a stirrer was charged with 3.3 mol of isophthalic acid and 10.5 mol of propylene glycol, and subjected to a polycondensation reaction at 200° C. to 210° C. while stirring under a nitrogen gas atmosphere. Thereafter, when the acid value of the reaction product became 20 mgKOH/g, it was cooled to 150° C., 6.7 mol of maleic anhydride was charged, and the mixture was reacted again at 210° C. to 220° C., thereby obtaining an unsaturated polyester having an acid value of 27.5 mgKOH/g. As a polymerization inhibitor, 0.01 parts by mass of hydroquinone and 66.7 parts by mass of styrene were added to 100 parts by mass of the obtained unsaturated polyester, and they were uniformly mixed to obtain an unsaturated polyester resin (styrene content of 40%).

3. Preparation of Saturated Polyester Resin

Synthesis Example 3

A flask equipped with a thermometer, a nitrogen gas introduction pipe, a reflux condenser, and a stirrer was charged with 4.0 mol of isophthalic acid and 10.5 mol of neopentyl glycol, and subjected to a polycondensation reaction at 200° C. to 210° C. while stirring under a nitrogen gas atmosphere. Thereafter, when the acid value of the reaction product became 10 mgKOH/g, the mixture was cooled to 150° C., 6.0 mol of adipic acid was charged, and the mixture was reacted again at 210° C. to 220° C., thereby obtaining a saturated polyester having an acid value of 9.5 mgKOH/g. As a polymerization inhibitor, 0.01 parts by mass of hydroquinone and 66.7 parts by mass of styrene were added to 100 parts by mass of the obtained saturated polyester, and they were uniformly mixed to obtain a saturated polyester resin (styrene content of 40%).

4. Preparation of Vinyl Ester Resin

Synthesis Example 4

A flask equipped with a stirrer, a reflux condenser, and a gas introduction pipe was charged with 114 parts by mass (1.0 equivalent) of bisphenol A, 555 parts by mass (3.0 equivalents) of bisphenol A epoxy resin (epoxy equivalent of 185), and as a catalyst, 0.15 parts by mass of triethylbenzylammonium chloride, and the charged mixture was reacted at 150° C. for 5 hours while blowing nitrogen to obtain a non-brominated epoxy resin having an epoxy equivalent of 335. After the mixture was cooled to 120° C., 0.10 parts by mass of hydroquinone as a polymerization inhibitor, 1.50 parts by mass of triethylbenzylammonium chloride as a catalyst, and 176 parts by mass (2.05 equivalents) of methacrylic acid were added, and the mixture was reacted at 110° C. for 8 hours while blowing air to obtain a vinyl ester having an acid value of 8.5 mgKOH/g. Then, 563 parts by mass of styrene was added to the vinyl ester to obtain a vinyl ester resin including 40% by mass of styrene.

5. Preparation of Unsaturated Polyester Resin Composition and Molding Material

Example 1

A mixture was prepared to obtain an unsaturated polyester resin composition. The mixture was made of 75 parts by mass of unsaturated polyester resin of Synthesis Example 1 (45 parts by mass of unsaturated polyester, 30 parts by mass of styrene); as a low shrinkage agent, 8 parts by mass of polyvinyl acetate solution (40% styrene solution of polyvinyl acetate) (4.8 parts by mass of polyvinyl acetate, 3.2 parts by mass of styrene); 10 parts by mass of saturated polyester resin of Synthesis Example 3 (6 parts by mass of saturated polyester, 4 parts by mass of styrene); as a polymerizable monomer, 7 parts by mass of styrene; as an electrically conductive filler, 2.5 parts by mass of carbon black (VULCAN XC72, manufactured by Cabot Corporation); 20 parts by mass of PAN-based carbon fiber milled fiber (CFMP-150R); as a polymerization inhibitor, 0.05 parts by mass of p-benzoquinone; as a curing agent, 1.0 part by mass of t-butyl peroxyisopropyl carbonate (PERBUTYL 1 I-75); as a release agent, 5 parts by mass of zinc stearate; 160 parts by mass of aluminum hydroxide (average particle size of 8 µm); and as a viscosity reducing agent, 1 part by mass of BYK-W996.

As a thickener, 0.8 parts by mass of magnesium oxide was added to the unsaturated polyester resin composition, and then, as a reinforcing fiber, a glass chop obtained by continuously cutting a glass roving to 25 mm was added so as to have the glass content of 27% by mass to obtain a molding material (SMC) by a known SMC impregnation machine. Thereafter, the resulting molding material was matured at 40° C. for 48 hours, and the viscosity thereof was thickened until the molding material was brought into a state capable of heat compression molding.

Examples 2 to 21 and Comparative Examples 1 to 8

A molding material was obtained in the same manner as in Example 1, except that the mixing formulation was changed in accordance with the descriptions of Tables 1 to 4.

6. Evaluation (Molding Shrinkage Rate)

The molding material was subjected to heat compression molding by using a flat metal plate of 300 mm×300 mm to obtain a flat plate-shaped molded article having a thickness of 4 mm.

Molding was carried out under the conditions of a molding temperature of both the product surface and the rear surface of 140° C., the molding pressure of 10 MPa, and the retaining time in a mold of 420 seconds. Thereafter, the molded article was defoamed from the mold and cooled immediately by being sandwiched between iron plates. Thereafter, the molded article was left to stand at 25° C. for 24 hours, the dimensions of the four sides of the molded article were measured at 25° C., and a shrinkage rate was measured by the ratio to the dimensions of the above-described flat plate mold. The results are shown in Tables 5 to 8.

Also, the superiority and inferiority of the shrinkage rate was evaluated in accordance with the following criteria. The results are shown in Tables 5 to 8.

Evaluation Criteria:
  Excellent: the shrinkage rate was below 0.
  Good: the shrinkage rate was 0 or more and below 0.10.
  Bad: the shrinkage rate was 0.10 or more.

(Flame Retardancy)

A molding material was molded in the same manner as in the production of the flat plate for measuring the molding shrinkage rate, and molding plates having a thickness of 4 mm, 3 mm, and 2.5 mm were obtained. A test piece was cut out from the molding plate, and a flammability test was carried out in conformity with the UL94 standard (plastic material flammability test) of the UL standard (Underwriters Laboratories Inc.). Each of the test pieces having a thickness of 4 mm, 3 mm, and 2.5 mm was evaluated whether the V-0 reference was satisfied. The results are shown in Tables 5 to 8.

In addition, the superiority and inferiority of the flame retardancy was evaluated in accordance with the following criteria. The results are shown in Tables 5 to 8.

Evaluation Criteria:
  Excellent: the flame retardancy conformed to the V-0 reference (thickness of 2.5 mm).
  Good: the flame retardancy conformed to the V-0 reference (thickness of 3 mm).
  Bad: the flame retardancy did not conform to the V-0 reference (thickness of 3 mm).

(Fuming Properties)

In the above-described flame retardancy test, generation of black fume at the time of burning was visually observed during the V-0 judgement test when a test piece having a thickness of 3 mm was used.

The superiority and inferiority of the fuming properties was evaluated in accordance with the following criteria. The results are shown in Tables 5 to 8.
  Excellent: black fume was not generated.
  Bad: black fume was generated.

(Linear Expansion Coefficient)

A test piece (4 mm×4 mm×5 mm) was cut from the flat plate-shaped molded article (thickness of 4 mm) used in the measurement of the molding shrinkage rate, and the linear expansion coefficient of the molded article in a horizontal direction was measured by using a compression-expansion probe with a thermomechanical analyzer (manufactured by Hitachi High-Tech Science Corporation, EXSTAR TMA SS7100). The temperature was raised from room temperature to 100° C. at a temperature rising rate of 5° C./min, and the linear expansion coefficient within a range of 50° C. to 80° C. was measured. The results are shown in Tables 5 to 8.

And, a difference between the obtained linear expansion coefficient and the linear expansion coefficient of aluminum (23.0 ppm/° C.) was also described in Tables 5 to 8.

The superiority and inferiority of the linear expansion coefficient was evaluated in accordance with the following criteria. The results are shown in Tables 5 to 8.
  Very Good: the absolute value of the difference from the linear expansion coefficient of the aluminum was 0 or more and below 5
  Bad: the absolute value of the difference from the linear expansion coefficient of the aluminum was 5 or more.

(Density)

A test piece was cut out from the flat plate-shaped molded article (thickness of 4 mm) used in the measurement of the molding shrinkage rate, and the density was measured in conformity with JIS K6911 (1995). The results are shown in Tables 5 to 8.

(Electromagnetic Shielding Properties)

A molding material was molded in the same manner as in the production of the flat plate for measuring the molding shrinkage rate, and a 2.5-mm molding plate was obtained. The molding plate was sandwiched between the closed cell of an electromagnetic wave shielding effect measurement device by the KEC method, and an attenuation rate (dB) of the electromagnetic waves was measured while the electrically conductive pattern was grounded. The measurement frequency was 1 MHz, 10 MHz, 100 MHz, and 1000 MHz, and the superiority and inferiority was evaluated in accordance with the following criteria with the attenuation rate (dB) at a frequency of 1 MHz as a reference. The results are shown in Tables 5 to 8.
  Excellent: above 60 dB
  Good: 40 dB or more and 60 dB or less
  Fair: 30 dB or more and below 40 dB
  Poor: 10 dB or more and below 30 dB
  Bad: below 10 dB (Production Stability)

<Evaluation of Impregnation State>

A carrier film was peeled off with a cutter knife immediately after the production of SMC, and a degree of impregnation of the unsaturated polyester resin composition and the glass fiber was visually evaluated.

The superiority and inferiority of the impregnation state was evaluated in accordance with the following criteria. The results are shown in Tables 5 to 8.

Excellent: the glass fiber was sufficiently wetted with the unsaturated polyester resin composition, and the glass fiber which was not impregnated into the unsaturated polyester resin composition was not observed.

Bad: glass fiber which was not impregnated into the unsaturated polyester resin composition was partially observed.

<Evaluation of Film Peeling Properties>

A carrier film of the molding material (SMC) after maturing was peeled off with a cutter knife to evaluate the film peeling properties.

The superiority and inferiority of the film peeling properties was evaluated in accordance with the following criteria. The results are shown in Tables 5 to 8.

Excellent: the film was smoothly peeled off with less tackiness in the SMC.

Bad: strong tackiness was observed in the SMC. Or, peeling of some components was observed upon film peeling.

(Surface Resistivity)

A molding material was molded in the same manner as in the production of the flat plate for measuring the molding shrinkage rate, and a 2.5-mm molding plate was obtained. The surface resistivity of the molding plate at 23° C. and 90° C. was measured in conformity with JIS K6911 (2006). The results are shown in Tables 5 to 8.

(Bending Properties)

A test piece (length of 80 mm, width of 10 mm) was cut out from the flat plate-shaped molded article (thickness of 4 mm) used in the measurement of the molding shrinkage rate, and a bending elastic modulus and the bending strength at 23° C. and 90° C. were measured in conformity with JIS K7017 (1999). The results are shown in Tables 5 to 8.

Further, the specific rigidity at 23° C. and 90° C. was calculated from the measurement results of the bending elastic modulus and the density by the following formula (5). The results are shown in Tables 5 to 8.

$$\text{Specific rigidity} = (\text{bending elastic modulus})^{1/3} / (\text{density}) \qquad (5)$$

(Tensile Properties)

A test piece was cut out from the flat plate-shaped molded article (thickness of 4 mm) used in the measurement of the molding shrinkage rate, and the tensile strength and a tensile elastic modulus at 23° C. were measured in conformity with JIS K7164 (2005). The results are shown in Tables 5 to 8.

TABLE 1

| | | | | | Unit | Example No. | | | |
|---|---|---|---|---|---|---|---|---|---|
| | | | | | | Ex. 1 | Ex. 2 | Ex. 3 | Ex. 4 |
| Unsaturated Polyester Resin Composition | Resin Component | Unsaturated Polyester Resin | | Unsaturated Polyester Resin of Synthesis Example 1 | parts by mass | 75 | 75 | 75 | 75 |
| | | | | Unsaturated Polyester Resin of Synthesis Example 2 | parts by mass | — | — | — | — |
| | | Polymerizable Monomer | | Styrene | parts by mass | 7 | 7 | 7 | 7 |
| | | Low Shrinkage Agent | | Polyvinyl Acetate Solution | parts by mass | 8 | 8 | 8 | 8 |
| | | | | Saturated Polyester Resin Solution of Synthesis Example 3 | parts by mass | 10 | 10 | 10 | 10 |
| | | | | Polystyrene Solution | parts by mass | — | — | — | — |
| | | | | Polyethylene Powder | parts by mass | — | — | — | — |
| | | Another Thermosetting Resin | | Vinyl Ester Resin of Synthesis Example 4 | parts by mass | — | — | — | — |
| | Aluminum Hydroxide | | | | parts by mass | 160 | 160 | 160 | 160 |
| | Electrically Conductive Filler | Electrically Conductive Particles | VULCAN XC72 | Carbon Black | parts by mass | 2.5 | 2.5 | 2.5 | — |
| | | | ECP | Carbon Black | parts by mass | — | — | — | — |
| | | Carbon Nanotube | SWCNT | Carbon Nanotube | parts by mass | — | — | — | 0.2 |
| | | Electrically Conductive Fiber | DONACARBO Milled S-241 | Pitch-Based Carbon Fiber Milled Fiber (Average Fiber Length of 0.14 mm) | parts by mass | — | — | — | — |

TABLE 1-continued

|  |  |  |  |  |  |  |  |  |
|---|---|---|---|---|---|---|---|---|
|  |  | DONACARBO Milled S-244 | Pitch-Based Carbon Fiber Milled Fiber (Average Fiber Length of 0.68 mm) | parts by mass | — | — | — | — |
|  |  | CFMP-150R | Pan Carbon Fiber Milled Fiber (Average Fiber Length of 0.15 mm and Another Blended) | parts by mass | 20 | 15 | 10 | 10 |
|  |  | 150RE-P | Pan Carbon Fiber Milled Fiber (Average Fiber Length of 0.10 mm) | parts by mass | — | — | — | — |
|  | Calcium Carbonate |  |  | parts by mass | — | — | — | — |
|  | Polymerization Inhibitor | p-benzoquinone |  | parts by mass | 0.05 | 0.05 | 0.05 | 0.05 |
|  | Curing Agent | PERBUTYL I-75 |  | parts by mass | 1 | 1 | 1 | 1 |
|  | Viscosity Reducing Agent | BYK-W996 |  | parts by mass | 3 | 3 | 3 | 3 |
|  | Release Agent | Zinc Stearate |  | parts by mass | 5 | 5 | 5 | 5 |
|  |  | BYK-P9060 |  | parts by mass | — | — | — | — |
|  | Flame Retardant | AP422 | Phosphorous Flame Retardant | parts by mass | — | — | — | — |
|  |  | FP-2500S | Phosphorous Flame Retardant | parts by mass | — | — | — | — |
|  |  | OP1230 | Phosphorous Flame Retardant | parts by mass | — | — | — | — |
|  | Thickenner | Magnesium Oxide |  | parts by mass | 0.8 | 0.8 | 0.8 | 0.8 |
| Reinforcing Fiber | Glass Fiber |  |  | % | 27 | 27 | 27 | 27 |
| Mixing Ratio of Polybasic Acid having Ethylenically Unsaturated Double Bond to 100 mol % of Polybasic Acid |  |  |  | mol % | 100 | 100 | 100 | 100 |
| Mixing Ratio of Polyvinyl Acetate to 100 parts by mass of Resin Component |  |  |  | parts by mass | 3.2 | 3.2 | 3.2 | 3.2 |
| Mixing Ratio of Saturated Polyester to 100 parts by mass of Resin Component |  |  |  | parts by mass | 6.0 | 6.0 | 6.0 | 6.0 |
| Mixing Ratio of Electrically Conductive Filler to 100 parts by mass of Resin Component |  |  |  | parts by mass | 22.5 | 17.5 | 12.5 | 10.2 |
| Mixing Ratio of Electrically Conductive Fiber to 100 parts by mass of Resin Component |  |  |  | parts by mass | 20 | 15 | 10 | 10 |
| Ratio of Electrically Conductive Fiber |  | Electrically Conductive Short Fiber |  | % by mass | 15 | 15 | 15 | 15 |
|  | Electrically Conductive Medium Long Fiber | Electrically Conductive Medium Fiber |  | % by mass | 70 | 70 | 70 | 70 |
|  |  | Electrically Conductive Long Fiber |  | % by mass | 15 | 15 | 15 | 15 |
| Volume Content Ratio of Molding Material | Filler-Excluding Component |  |  | % by volume | 42.4 | 44.2 | 46.4 | 46.5 |
|  | Electrically Conductive Filler |  |  | % by volume | 5.9 | 4.6 | 3.3 | 2.7 |
|  | Calcium Carbonate |  |  | % by volume | — | — | — | — |
|  | Aluminum Hydroxide |  |  | % by volume | 31.4 | 31.4 | 31.1 | 31.4 |
|  | Reinforcing Fiber |  |  | % by volume | 20.2 | 19.9 | 19.3 | 19.4 |

|  |  |  |  |  |  | Example No. | | |
|---|---|---|---|---|---|---|---|---|
|  |  |  |  |  | Unit | Ex. 5 | Ex. 6 | Ex. 7 |
| Unsaturated Polyester Resin Composition | Resin Component | Unsaturated Polyester Resin | Unsaturated Polyester Resin of Synthesis Example 1 |  | parts by mass | 75 | 75 | 75 |
|  |  |  | Unsaturated Polyester Resin of Synthesis Example 2 |  | parts by mass | — | — | — |
|  |  | Polymerizable Monomer | Styrene |  | parts by mass | 7 | 7 | 7 |
|  |  | Low Shrinkage Agent | Polyvinyl Acetate Solution |  | parts by mass | 8 | 8 | 8 |
|  |  |  | Saturated Polyester Resin Solution of Synthesis Example 3 |  | parts by mass | 10 | 10 | 10 |

TABLE 1-continued

| | | | | | | | | |
|---|---|---|---|---|---|---|---|---|
| | | | | Polystyrene Solution | parts by mass | — | — | — |
| | | | | Polyethylene Powder | parts by mass | — | — | — |
| | | Another Thermosetting Resin | | Vinyl Ester Resin of Synthesis Example 4 | parts by mass | — | — | — |
| | Aluminum Hydroxide | | | | parts by mass | 160 | 160 | 160 |
| | Electrically Conductive Filler | Electrically Conductive Particles | VULCAN XC72 | Carbon Black | parts by mass | — | — | — |
| | | | ECP | Carbon Black | parts by mass | — | — | — |
| | | Carbon Nanotube | SWCNT | Carbon Nanotube | parts by mass | 0.25 | 0.2 | 0.2 |
| | | Electrically Conductive Fiber | DONACARBO Milled S-241 | Pitch-Based Carbon Fiber Milled Fiber (Average Fiber Length of 0.14 mm) | parts by mass | 1 | 1 | — |
| | | | DONACARBO Milled S-244 | Pitch-Based Carbon Fiber Milled Fiber (Average Fiber Length of 0.68 mm) | parts by mass | 9 | 9 | — |
| | | | CFMP-150R | Pan Carbon Fiber Milled Fiber (Average Fiber Length of 0.15 mm and Another Blended) | parts by mass | — | — | — |
| | | | 150RE-P | Pan Carbon Fiber Milled Fiber (Average Fiber Length of 0.10 mm) | parts by mass | — | — | — |
| | Calcium Carbonate | | | | parts by mass | — | — | — |
| | Polymerization Inhibitor | | p-benzoquinone | | parts by mass | 0.05 | 0.05 | 0.05 |
| | Curing Agent | | PERBUTYL I-75 | | parts by mass | 1 | 1 | 1 |
| | Viscosity Reducing Agent | | BYK-W996 | | parts by mass | 3 | 3 | 3 |
| | Release Agent | | Zinc Stearate | | parts by mass | 5 | 5 | 5 |
| | | | BYK-P9060 | | parts by mass | — | — | — |
| | Flame Retardant | | AP422 | Phosphorous Flame Retardant | parts by mass | — | — | — |
| | | | FP-2500S | Phosphorous Flame Retardant | parts by mass | — | — | — |
| | | | OP1230 | Phosphorous Flame Retardant | parts by mass | — | — | — |
| | Thickenner | | Magnesium Oxide | | parts by mass | 0.8 | 0.8 | 0.8 |
| Reinforcing Fiber | Glass Fiber | | | | % | 27 | 27 | 27 |
| Mixing Ratio of Polybasic Acid having Ethylenically Unsaturated Double Bond to 100 mol % of Polybasic Acid | | | | | mol % | 100 | 100 | 100 |
| Mixing Ratio of Polyvinyl Acetate to 100 parts by mass of Resin Component | | | | | parts by mass | 3.2 | 3.2 | 3.2 |
| Mixing Ratio of Saturated Polyester to 100 parts by mass of Resin Component | | | | | parts by mass | 6.0 | 6.0 | 6.0 |
| Mixing Ratio of Electrically Conductive Filler to 100 parts by mass of Resin Component | | | | | parts by mass | 10.25 | 10.2 | 0.2 |
| Mixing Ratio of Electrically Conductive Fiber to 100 parts by mass of Resin Component | | | | | parts by mass | 10 | 10 | — |
| Ratio of Electrically Conductive Fiber | Electrically Conductive Short Fiber | | | | % by mass | 14.5 | 14.5 | — |
| | Electrically Conductive Medium Long Fiber | Electrically Conductive Medium Fiber | | | % by mass | 85.5 | 85.5 | — |
| | | Electrically Conductive Long Fiber | | | % by mass | — | — | — |
| Volume Content Ratio of Molding Material | Filler-Excluding Component | | | | % by volume | 46.7 | 46.5 | 48.4 |
| | Electrically Conductive Filler | | | | % by volume | 2.7 | 2.7 | 0.1 |
| | Calcium Carbonate | | | | % by volume | — | — | — |
| | Aluminum Hydroxide | | | | % by volume | 31.3 | 31.4 | 32.3 |
| | Reinforcing Fiber | | | | % by volume | 19.3 | 19.4 | 19.2 |

TABLE 2

| | | | | Unit | Ex. 8 | Ex. 9 | Ex. 10 | Ex. 11 |
|---|---|---|---|---|---|---|---|---|
| Unsaturated Polyester Resin Composition | Resin Component | Unsaturated Polyester Resin | Unsaturated Polyester Resin of Synthesis Example 1 | parts by mass | 75 | 75 | 75 | 75 |
| | | | Unsaturated Polyester Resin of Synthesis Example 2 | parts by mass | — | — | — | — |
| | | Polymerizable Monomer | Styrene | parts by mass | 7 | 7 | 7 | 7 |
| | | Low Shrinkage Agent | Polyvinyl Acetate Solution | parts by mass | 8 | 8 | 8 | 8 |
| | | | Saturated Polyester Resin Solution of Synthesis Example 3 | parts by mass | 10 | 10 | 10 | 10 |
| | | | Polystyrene Solution | parts by mass | — | — | — | — |
| | | | Polyethylene Powder | parts by mass | — | — | — | — |
| | | Another Thermosetting Resin | Vinyl Ester Resin of Synthesis Example 4 | parts by mass | — | — | — | — |
| | Aluminum Hydroxide | | | parts by mass | 130 | 130 | 130 | 160 |
| | Electrically Conductive Filler | Electrically Conductive Particles | VULCAN XC72 | Carbon Black | parts by mass | 2.5 | 2.5 | 2.5 | 2.5 |
| | | | ECP | Carbon Black | parts by mass | — | — | — | — |
| | | Carbon Nanotube | SWCNT | Carbon Nanotube | parts by mass | — | — | — | — |
| | | Electrically Conductive Fiber | DONACARBO Milled S-241 | Pitch-Based Carbon Fiber Milled Fiber (Average Fiber Length of 0.14 mm) | parts by mass | 1 | 1 | 1 | 1 |
| | | | DONACARBO Milled S-244 | Pitch-Based Carbon Fiber Milled Fiber (Average Fiber Length of 0.68 mm) | parts by mass | 9 | 9 | 9 | 9 |
| | | | CFMP-150R | Pan Carbon Fiber Milled Fiber (Average Fiber Length of 0.15 mm and Another Blended) | parts by mass | — | — | — | — |
| | | | 150RE-P | Pan Carbon Fiber Milled Fiber (Average Fiber Length of 0.10 mm) | parts by mass | — | — | — | — |
| | Calcium Carbonate | | | parts by mass | — | — | — | — |
| | Polymerization Inhibitor | p-benzoquinone | | parts by mass | 0.05 | 0.05 | 0.05 | 0.05 |
| | Curing Agent | PERBUTYL I-75 | | parts by mass | 1 | 1 | 1 | 1 |
| | Viscosity Reducing Agent | BYK-W996 | | parts by mass | 3 | 3 | 3 | 3 |
| | Release Agent | Zinc Stearate | | parts by mass | 5 | 5 | 5 | 5 |
| | | BYK-P9060 | | parts by mass | — | — | — | — |
| | Flame Retardant | AP422 | Phosphorous Flame Retardant | parts by mass | 20 | — | — | — |
| | | FP-2500S | Phosphorous Flame Retardant | parts by mass | — | 20 | — | — |

TABLE 2-continued

|  |  |  |  | Unit | | | |
|---|---|---|---|---|---|---|---|
|  |  | OP1230 | Phosphorous Flame Retardant | parts by mass | — | — | 20 | — |
|  | Thickenner | Magnesium Oxide |  | parts by mass | 0.8 | 0.8 | 0.8 | 0.8 |
| Reinforcing Fiber | Glass Fiber |  |  | % | 27 | 27 | 27 | 27 |
| Mixing Ratio of Polybasic Acid having Ethylenically Unsaturated Double Bond to 100 mol % of Polybasic Acid |  |  |  | mol % | 100 | 100 | 100 | 100 |
| Mixing Ratio of Polyvinyl Acetate to 100 parts by mass of Resin Component |  |  |  | parts by mass | 3.2 | 3.2 | 3.2 | 3.2 |
| Mixing Ratio of Saturated Polyester to 100 parts by mass of Resin Component |  |  |  | parts by mass | 6.0 | 6.0 | 6.0 | 6.0 |
| Mixing Ratio of Electrically Conductive Filler to 100 parts by mass of Resin Component |  |  |  | parts by mass | 12.5 | 12.5 | 12.5 | 12.5 |
| Mixing Ratio of Electrically Conductive Fiber to 100 parts by mass of Resin Component |  |  |  | parts by mass | 10 | 10 | 10 | 10 |
| Ratio of Electrically Conductive Fiber | Electrically Conductive Short Fiber |  |  | % by mass | 14.5 | 14.5 | 14.5 | 14.5 |
|  | Electrically Conductive Medium Long Fiber | Electrically Conductive Medium Fiber |  | % by mass | 85.5 | 85.5 | 85.5 | 85.5 |
|  |  | Electrically Conductive Long Fiber |  | % by mass | — | — | — | — |
| Volume Content Ratio of Molding Material | Filler-Excluding Component |  |  | % by volume | 51.8 | 51.9 | 52.7 | 46.2 |
|  | Electrically Conductive Filler |  |  | % by volume | 3.3 | 3.3 | 3.3 | 3.3 |
|  | Calcium Carbonate |  |  | % by volume | — | — | — | — |
|  | Aluminum Hydroxide |  |  | % by volume | 25.8 | 25.7 | 25.3 | 31.1 |
|  | Reinforcing Fiber |  |  | % by volume | 19.1 | 19.0 | 18.7 | 19.4 |

|  |  |  |  |  | Example No. | | |
|---|---|---|---|---|---|---|---|
|  |  |  |  | Unit | Ex. 12 | Ex. 13 | Ex. 14 |
| Unsaturated Polyester Resin Composition | Resin Component | Unsaturated Polyester Resin | Unsaturated Polyester Resin of Synthesis Example 1 | parts by mass | 75 | 65 | 75 |
|  |  |  | Unsaturated Polyester Resin of Synthesis Example 2 | parts by mass | — | — | — |
|  |  | Polymerizable Monomer | Styrene | parts by mass | 7 | 7 | 7 |
|  |  | Low Shrinkage Agent | Polyvinyl Acetate Solution | parts by mass | 8 | 8 | 8 |
|  |  |  | Saturated Polyester Resin Solution of Synthesis Example 3 | parts by mass | 10 | 10 | 10 |
|  |  |  | Polystyrene Solution | parts by mass | — | — | — |
|  |  |  | Polyethylene Powder | parts by mass | — | — | — |
|  |  | Another Thermosetting Resin | Vinyl Ester Resin of Synthesis Example 4 | parts by mass | — | 10 | — |
|  | Aluminum Hydroxide |  |  | parts by mass | 160 | 160 | 160 |
|  | Electrically Conductive Filler | Electrically Conductive Particles | VULCAN XC72 Carbon Black | parts by mass | 2.5 | 2.5 | 2.5 |
|  |  |  | ECP Carbon Black | parts by mass | — | — | — |
|  |  | Carbon Nanotube | SWCNT Carbon Nanotube | parts by mass | — | — | — |
|  |  | Electrically Conductive Fiber | DONACARBO Milled S-241 Pitch-Based Carbon Fiber Milled Fiber (Average Fiber Length of 0.14 mm) | parts by mass | 1 | 1 | — |
|  |  |  | DONACARBO Milled S-244 Pitch-Based Carbon Fiber Milled Fiber (Average Fiber Length of 0.68 mm) | parts by mass | 9 | 9 | — |
|  |  |  | CFMP-150R Pan Carbon Fiber Milled Fiber (Average Fiber Length of 0.15 mm and Another Blended) | parts by mass | — | — | — |

TABLE 2-continued

| | | | | parts by mass | | | |
|---|---|---|---|---|---|---|---|
| | | 150RE-P | Pan Carbon Fiber Milled Fiber (Average Fiber Length of 0.10 mm) | parts by mass | — | — | 10 |
| | Calcium Carbonate | | | parts by mass | | | |
| | Polymerization Inhibitor | p-benzoquinone | | parts by mass | 0.05 | 0.05 | 0.05 |
| | Curing Agent | PERBUTYL I-75 | | parts by mass | 1 | 1 | 1 |
| | Viscosity Reducing Agent | BYK-W996 | | parts by mass | 3 | 3 | 3 |
| | Release Agent | Zinc Stearate | | parts by mass | — | 5 | 5 |
| | | BYK-P9060 | | parts by mass | 5 | — | — |
| | Flame Retardant | AP422 | Phosphorous Flame Retardant | parts by mass | — | — | — |
| | | FP-2500S | Phosphorous Flame Retardant | parts by mass | — | — | — |
| | | OP1230 | Phosphorous Flame Retardant | parts by mass | — | — | — |
| | Thickenner | Magnesium Oxide | | parts by mass | 0.8 | 0.8 | 0.8 |
| Reinforcing Fiber | Glass Fiber | | | % | 27 | 27 | 27 |
| Mixing Ratio of Polybasic Acid having Ethylenically Unsaturated Double Bond to 100 mol % of Polybasic Acid | | | | mol % | 100 | 100 | 100 |
| Mixing Ratio of Polyvinyl Acetate to 100 parts by mass of Resin Component | | | | parts by mass | 3.2 | 3.2 | 3.2 |
| Mixing Ratio of Saturated Polyester to 100 parts by mass of Resin Component | | | | parts by mass | 6.0 | 6.0 | 6.0 |
| Mixing Ratio of Electrically Conductive Filler to 100 parts by mass of Resin Component | | | | parts by mass | 12.5 | 12.5 | 12.5 |
| Mixing Ratio of Electrically Conductive Fiber to 100 parts by mass of Resin Component | | | | parts by mass | 10 | 10 | 10 |
| Ratio of Electrically Conductive Fiber | Electrically Conductive Short Fiber | | | % by mass | 14.5 | 14.5 | 60 |
| | Electrically Conductive Medium Long Fiber | Electrically Conductive Medium Fiber | | % by mass | 85.5 | 85.5 | 40 |
| | | Electrically Conductive Long Fiber | | % by mass | — | — | — |
| Volume Content Ratio of Molding Material | Filler-Excluding Component | | | % by volume | 46.2 | 46.2 | 46.2 |
| | Electrically Conductive Filler | | | % by volume | 3.3 | 3.3 | 3.3 |
| | Calcium Carbonate | | | % by volume | — | — | — |
| | Aluminum Hydroxide | | | % by volume | 31.1 | 31.1 | 31.1 |
| | Reinforcing Fiber | | | % by volume | 19.4 | 19.4 | 19.4 |

TABLE 3

| | | | | | Example No. | | | |
|---|---|---|---|---|---|---|---|---|
| | | | | Unit | Ex. 15 | Ex. 16 | Ex. 17 | Ex. 18 |
| Unsaturated Polyester Resin Composition | Resin Component | Unsaturated Polyester Resin | Unsaturated Polyester Resin of Synthesis Example 1 | parts by mass | 75 | 75 | 75 | 75 |
| | | | Unsaturated Polyester Resin of Synthesis Example 2 | parts by mass | — | — | — | — |
| | | Polymerizable Monomer | Styrene | parts by mass | 7 | 7 | 7 | 7 |
| | | Low Shrinkage Agent | Polyvinyl Acetate Solution | parts by mass | 8 | 8 | 8 | 8 |
| | | | Saturated Polyester Resin Solution of Synthesis Example 3 | parts by mass | 10 | 10 | 10 | 10 |
| | | | Polystyrene Solution | parts by mass | — | — | — | — |
| | | | Polyethylene Powder | parts by mass | | | | |

TABLE 3-continued

| | | | | Unit | | | | |
|---|---|---|---|---|---|---|---|---|
| | Another Thermosetting Resin | Vinyl Ester Resin of Synthesis Example 4 | | parts by mass | — | — | — | — |
| | Aluminum Hydroxide | | | parts by mass | 160 | 160 | 160 | 160 |
| | Electrically Conductive Filler | Electrically Conductive Particles | VULCAN XC72 | Carbon Black | parts by mass | — | — | 2.5 | 2.5 |
| | | | ECP | Carbon Black | parts by mass | 1.25 | — | — | — |
| | | Carbon Nanotube | SWCNT | Carbon Nanotube | parts by mass | — | — | — | — |
| | | Electrically Conductive Fiber | DONACARBO Milled S-241 | Pitch-Based Carbon Fiber Milled Fiber (Average Fiber Length of 0.14 mm) | parts by mass | 1 | 1 | — | 0.4 |
| | | | DONACARBO Milled S-244 | Pitch-Based Carbon Fiber Milled Fiber (Average Fiber Length of 0.68 mm) | parts by mass | 9 | 9 | — | 3.6 |
| | | | CFMP-150R | Pan Carbon Fiber Milled Fiber (Average Fiber Length of 0.15 mm and Another Blended) | parts by mass | — | — | — | — |
| | | | 150RE-P | Pan Carbon Fiber Milled Fiber (Average Fiber Length of 0.10 mm) | parts by mass | — | — | — | — |
| | Calcium Carbonate | | | parts by mass | — | — | — | — |
| | Polymerization Inhibitor | p-benzoquinone | | parts by mass | 0.05 | 0.05 | 0.05 | 0.05 |
| | Curing Agent | PERBUTYL I-75 | | parts by mass | 1 | 1 | 1 | 1 |
| | Viscosity Reducing Agent | BYK-W996 | | parts by mass | 3 | 3 | 3 | 3 |
| | Release Agent | Zinc Stearate | | parts by mass | 5 | 5 | 5 | 5 |
| | | BYK-P9060 | | parts by mass | — | — | — | — |
| | Flame Retardant | AP422 | Phosphorous Flame Retardant | parts by mass | — | — | — | — |
| | | FP-2500S | Phosphorous Flame Retardant | parts by mass | — | — | — | — |
| | | OP1230 | Phosphorous Flame Retardant | parts by mass | — | — | — | — |
| | Thickenner | Magnesium Oxide | | parts by mass | 0.8 | 0.8 | 0.8 | 0.8 |
| Reinforcing Fiber | Glass Fiber | | | % | 27 | 27 | 27 | 27 |
| Mixing Ratio of Polybasic Acid having Ethylenically Unsaturated Double Bond to 100 mol % of Polybasic Acid | | | | mol % | 100 | 100 | 100 | 100 |
| Mixing Ratio of Polyvinyl Acetate to 100 parts by mass of Resin Component | | | | parts by mass | 3.2 | 3.2 | 3.2 | 3.2 |
| Mixing Ratio of Saturated Polyester to 100 parts by mass of Resin Component | | | | parts by mass | 6.0 | 6.0 | 6.0 | 6.0 |
| Mixing Ratio of Electrically Conductive Filler to 100 parts by mass of Resin Component | | | | parts by mass | 11.25 | 10 | 2.5 | 6.5 |
| Mixing Ratio of Electrically Conductive Fiber to 100 parts by mass of Resin Component | | | | parts by mass | 10 | 10 | — | 4 |
| Ratio of Electrically Conductive Fiber | Electrically Conductive Short Fiber | | | % by mass | 14.5 | 14.5 | — | 14.5 |
| | Electrically Conductive Medium Long Fiber | Electrically Conductive Medium Fiber | | % by mass | 85.5 | 85.5 | — | 85.5 |
| | | Electrically Conductive Long Fiber | | % by mass | — | — | — | — |
| Volume Content Ratio of Molding Material | Filler-Excluding Component | | | % by volume | 46.4 | 46.6 | 47.8 | 47.2 |
| | Electrically Conductive Filler | | | % by volume | 3.0 | 2.6 | 0.7 | 1.7 |
| | Calcium Carbonate | | | % by volume | — | — | — | — |
| | Aluminum Hydroxide | | | % by volume | 31.3 | 31.4 | 32.2 | 31.8 |
| | Reinforcing Fiber | | | % by volume | 19.4 | 19.3 | 19.3 | 19.3 |

| | | | | | Example No. | | |
|---|---|---|---|---|---|---|---|
| | | | | Unit | Ex. 19 | Ex. 20 | Ex. 21 |
| Unsaturated Polyester Resin Composition | Resin Component | Unsaturated Polyester Resin | Unsaturated Polyester Resin of Synthesis Example 1 | parts by mass | 75 | 75 | 75 |

TABLE 3-continued

| | | | | | | | |
|---|---|---|---|---|---|---|---|
| | | | Unsaturated Polyester Resin of Synthesis Example 2 | parts by mass | — | — | — |
| | Polymerizable Monomer | | Styrene | parts by mass | 7 | 7 | 7 |
| | Low Shrinkage Agent | | Polyvinyl Acetate Solution | parts by mass | 8 | 8 | 8 |
| | | | Saturated Polyester Resin Solution of Synthesis Example 3 | parts by mass | 10 | 10 | 10 |
| | | | Polystyrene Solution | parts by mass | — | — | — |
| | | | Polyethylene Powder | parts by mass | — | — | — |
| | Another Thermosetting Resin | | Vinyl Ester Resin of Synthesis Example 4 | parts by mass | — | — | — |
| Aluminum Hydroxide | | | | parts by mass | 160 | 160 | 160 |
| Electrically Conductive Filler | Electrically Conductive Particles | VULCAN XC72 | Carbon Black | parts by mass | 2.5 | 2.5 | 2.5 |
| | | ECP | Carbon Black | parts by mass | — | — | — |
| | Carbon Nanotube | SWCNT | Carbon Nanotube | parts by mass | — | — | — |
| | Electrically Conductive Fiber | DONACARBO Milled S-241 | Pitch-Based Carbon Fiber Milled Fiber (Average Fiber Length of 0.14 mm) | parts by mass | 2.3 | — | 10 |
| | | DONACARBO Milled S-244 | Pitch-Based Carbon Fiber Milled Fiber (Average Fiber Length of 0.68 mm) | parts by mass | 20.3 | 10 | — |
| | | CFMP-150R | Pan Carbon Fiber Milled Fiber (Average Fiber Length of 0.15 mm and Another Blended) | parts by mass | — | — | — |
| | | 150RE-P | Pan Carbon Fiber Milled Fiber (Average Fiber Length of 0.10 mm) | parts by mass | — | — | — |
| Calcium Carbonate | | | | parts by mass | — | — | — |
| Polymerization Inhibitor | | p-benzoquinone | | parts by mass | 0.05 | 0.05 | 0.05 |
| Curing Agent | | PERBUTYL I-75 | | parts by mass | 1 | 1 | 1 |
| Viscosity Reducing Agent | | BYK-W996 | | parts by mass | 3 | 3 | 3 |
| Release Agent | | Zinc Stearate | | parts by mass | 5 | 5 | 5 |
| | | BYK-P9060 | | parts by mass | — | — | — |
| Flame Retardant | | AP422 | Phosphorous Flame Retardant | parts by mass | — | — | — |
| | | FP-2500S | Phosphorous Flame Retardant | parts by mass | — | — | — |
| | | OP1230 | Phosphorous Flame Retardant | parts by mass | — | — | — |
| Thickenner | | Magnesium Oxide | | parts by mass | 0.8 | 0.8 | 0.8 |

TABLE 3-continued

| | | | | | | |
|---|---|---|---|---|---|---|
| Reinforcing Fiber | Glass Fiber | | % | 27 | 27 | 27 |
| Mixing Ratio of Polybasic Acid having Ethylenically Unsaturated Double Bond to 100 mol % of Polybasic Acid | | | mol % | 100 | 100 | 100 |
| Mixing Ratio of Polyvinyl Acetate to 100 parts by mass of Resin Component | | | parts by mass | 3.2 | 3.2 | 3.2 |
| Mixing Ratio of Saturated Polyester to 100 parts by mass of Resin Component | | | parts by mass | 6.0 | 6.0 | 6.0 |
| Mixing Ratio of Electrically Conductive Filler to 100 parts by mass of Resin Component | | | parts by mass | 25.1 | 12.5 | 12.5 |
| Mixing Ratio of Electrically Conductive Fiber to 100 parts by mass of Resin Component | | | parts by mass | 22.6 | 10 | 10 |
| Ratio of Electrically Conductive Fiber | Electrically Conductive Short Fiber | | % by mass | 14.5 | 10 | 55 |
| | Electrically Conductive Medium Long Fiber | Electrically Conductive Medium Fiber | % by mass | 85.5 | 90 | 45 |
| | | Electrically Conductive Long Fiber | % by mass | — | — | — |
| Volume Content Ratio of Molding Material | Filler-Excluding Component | | % by volume | 42.2 | 46.2 | 46.2 |
| | Electrically Conductive Filler | | % by volume | 6.5 | 3.3 | 3.3 |
| | Calcium Carbonate | | % by volume | — | — | — |
| | Aluminum Hydroxide | | % by volume | 31.1 | 31.1 | 31.1 |
| | Reinforcing Fiber | | % by volume | 20.2 | 19.4 | 19.4 |

TABLE 4

| | | | | | Example No. | | | | | |
|---|---|---|---|---|---|---|---|---|---|---|
| | | | | Unit | Comp. Ex. 1 | Comp. Ex. 2 | Comp. Ex. 3 | Comp. Ex. 4 | Comp. Ex. 5 |
| Unsaturated Polyester Resin Composition | Resin Component | Unsaturated Polyester Resin | Unsaturated Polyester Resin of Synthesis Example 1 | parts by mass | — | 75 | 75 | 70 | 75 |
| | | | Unsaturated Polyester Resin of Synthesis Example 2 | parts by mass | 75 | — | — | — | — |
| | | Polymerizable Monomer | Styrene | parts by mass | 7 | — | 15 | — | 7 |
| | | Low Shrinkage Agent | Polyvinyl Acetate Solution | parts by mass | 8 | — | 5 | 30 | 8 |
| | | | Saturated Polyester Resin Solution of Synthesis Example 3 | parts by mass | 10 | — | — | — | 10 |
| | | | Polystyrene Solution | parts by mass | — | 15 | 5 | — | — |
| | | | Polyethylene Powder | parts by mass | — | 10 | — | — | — |
| | | Another Thermosetting Resin | Vinyl Ester Resin of Synthesis Example 4 | parts by mass | — | — | — | — | — |
| | Aluminum Hydroxide | | | parts by mass | 160 | 160 | 160 | 160 | — |
| | Electrically Conductive Filler | Electrically Conductive Particles | VULCAN XC72 | Carbon Black | parts by mass | 2.5 | 2.5 | 2.5 | 2.5 | 2.5 |
| | | | ECP | Carbon Black | parts by mass | — | — | — | — | — |
| | | Carbon Nanotube | SWCNT | Carbon Nanotube | parts by mass | — | — | — | — | — |
| | | Electrically Conductive Fiber | DONACARBO Milled S-241 | Pitch-Based Carbon Fiber Milled Fiber (Average Fiber Length of 0.14 mm) | parts by mass | 1 | 1 | 1 | 1 | 1 |
| | | | DONACARBO Milled S-244 | Pitch-Based Carbon Fiber Milled Fiber (Average Fiber Length of 0.68 mm) | parts by mass | 9 | 9 | 9 | 9 | 9 |

TABLE 4-continued

| | | | | | | | | | |
|---|---|---|---|---|---|---|---|---|---|
| | | CFMP-150R | Pan Carbon Fiber Milled Fiber (Average Fiber Length of 0.15 mm and Another Blended) | parts by mass | — | — | — | — | — |
| | | 150RE-P | Pan Carbon Fiber Milled Fiber (Average Fiber Length of 0.10 mm) | parts by mass | — | — | — | — | — |
| | Calcium Carbonate | | | parts by mass | — | — | — | — | 180 |
| | Polymerization Inhibitor | p-benzoquinone | | parts by mass | 0.05 | 0.05 | 0.05 | 0.05 | 0.05 |
| | Curing Agent | PERBUTYL I-75 | | parts by mass | 1 | 1 | 1 | 1 | 1 |
| | Viscosity Reducing Agent | BYK-W996 | | parts by mass | 3 | 3 | 3 | 3 | 3 |
| | Release Agent | Zinc Stearate | | parts by mass | 5 | 5 | 5 | 5 | 5 |
| | | BYK-P9060 | | parts by mass | — | — | — | — | — |
| | Flame Retardant | AP422 | Phosphorous Flame Retardant | parts by mass | — | — | — | — | — |
| | | FP-2500S | Phosphorous Flame Retardant | parts by mass | — | — | — | — | — |
| | | OP1230 | Phosphorous Flame Retardant | parts by mass | — | — | — | — | — |
| | Thickenner | Magnesium Oxide | | parts by mass | 0.8 | 0.8 | 0.8 | 0.8 | 0.8 |
| Reinforcing Fiber | Glass Fiber | | | % | 27 | 27 | 27 | 27 | 26 |
| Mixing Ratio of Polybasic Acid having Ethylenically Unsaturated Double Bond to 100 mol % of Polybasic Acid | | | | mol % | 67 | 100 | 100 | 100 | 100 |
| Mixing Ratio of Polyvinyl Acetate to 100 parts by mass of Resin Component | | | | parts by mass | 3.2 | 0 | 2 | 12 | 3.2 |
| Mixing Ratio of Saturated Polyester to 100 parts by mass of Resin Component | | | | parts by mass | 6.0 | 0.0 | 0.0 | 0.0 | 6.0 |
| Mixing Ratio of Electrically Conductive Filler to 100 parts by mass of Resin Component | | | | parts by mass | 12.5 | 12.5 | 12.5 | 12.5 | 12.5 |
| Mixing Ratio of Electrically Conductive Fiber to 100 parts by mass of Resin Component | | | | parts by mass | 10 | 10 | 10 | 10 | 10 |
| Ratio of Electrically Conductive Fiber | Electrically Conductive Short Fiber | | | % by mass | 14.5 | 14.5 | 14.5 | 14.5 | 15 |
| | Electrically Conductive Medium Long Fiber | Electrically Conductive Medium Fiber | | % by mass | 85.5 | 85.5 | 85.5 | 85.5 | 85 |
| | | Electrically Conductive Long Fiber | | % by mass | — | — | — | — | — |
| Volume Content Ratio of Molding Material | Filler-Excluding Component | | | % by volume | 46.2 | 46.2 | 46.2 | 46.2 | 46.2 |
| | Electrically Conductive Filler | | | % by volume | 3.3 | 3.3 | 3.3 | 3.3 | 3.3 |
| | Calcium Carbonate | | | % by volume | — | — | — | — | 31.0 |
| | Aluminum Hydroxide | | | % by volume | 31.1 | 31.1 | 31.1 | 31.1 | — |
| | Reinforcing Fiber | | | % by volume | 19.4 | 19.4 | 19.4 | 19.4 | 19.6 |

| | | | | | Example No. | | |
|---|---|---|---|---|---|---|---|
| | | | | Unit | Comp. Ex. 6 | Comp. Ex. 7 | Comp. Ex. 8 |
| Unsaturated Polyester Resin Composition | Resin Component | Unsaturated Polyester Resin | Unsaturated Polyester Resin of Synthesis Example 1 | parts by mass | 75 | 75 | 75 |
| | | | Unsaturated Polyester Resin of Synthesis Example 2 | parts by mass | — | — | — |
| | | Polymerizable Monomer | Styrene | parts by mass | 7 | 7 | 7 |
| | | Low Shrinkage Agent | Polyvinyl Acetate Solution | parts by mass | 8 | 8 | 8 |
| | | | Saturated Polyester Resin Solution of Synthesis Example 3 | parts by mass | 10 | 10 | 10 |
| | | | Polystyrene Solution | parts by mass | — | — | — |
| | | | Polyethylene Powder | parts by mass | — | — | — |

TABLE 4-continued

| | | | | | | | |
|---|---|---|---|---|---|---|---|
| | Another Thermosetting Resin | | Vinyl Ester Resin of Synthesis Example 4 | parts by mass | — | — | — |
| | Aluminum Hydroxide | | | parts by mass | 40 | 350 | 150 |
| | Electrically Conductive Filler | Electrically Conductive Particles | VULCAN XC72 | Carbon Black | parts by mass | 2.5 | 2.5 | — |
| | | | ECP | Carbon Black | parts by mass | — | — | — |
| | | Carbon Nanotube | SWCNT | Carbon Nanotube | parts by mass | — | — | — |
| | | Electrically Conductive Fiber | DONACARBO Milled S-241 | Pitch-Based Carbon Fiber Milled Fiber (Average Fiber Length of 0.14 mm) | parts by mass | 1 | 1 | — |
| | | | DONACARBO Milled S-244 | Pitch-Based Carbon Fiber Milled Fiber (Average Fiber Length of 0.68 mm) | parts by mass | 9 | 9 | — |
| | | | CFMP-150R | Pan Carbon Fiber Milled Fiber (Average Fiber Length of 0.15 mm and Another Blended) | parts by mass | — | — | — |
| | | | 150RE-P | Pan Carbon Fiber Milled Fiber (Average Fiber Length of 0.10 mm) | parts by mass | — | — | — |
| | Calcium Carbonate | | | parts by mass | — | — | — |
| | Polymerization Inhibitor | p-benzoquinone | | parts by mass | 0.05 | 0.05 | 0.05 |
| | Curing Agent | PERBUTYL I-75 | | parts by mass | 1 | 1 | 1 |
| | Viscosity Reducing Agent | BYK-W996 | | parts by mass | 3 | 3 | 3 |
| | Release Agent | Zinc Stearate | | parts by mass | 5 | 5 | 5 |
| | | BYK-P9060 | | parts by mass | — | — | — |
| | Flame Retardant | AP422 | Phosphorous Flame Retardant | parts by mass | — | — | — |
| | | FP-2500S | Phosphorous Flame Retardant | parts by mass | — | — | — |
| | | OP1230 | Phosphorous Flame Retardant | parts by mass | — | — | — |
| | Thickenner | Magnesium Oxide | | parts by mass | 0.8 | 0.8 | 0.8 |
| Reinforcing Fiber | Glass Fiber | | | % | 29 | 25 | 28 |
| Mixing Ratio of Polybasic Acid having Ethylenically Unsaturated Double Bond to 100 mol % of Polybasic Acid | | | | mol % | 100 | 100 | 100 |
| Mixing Ratio of Polyvinyl Acetate to 100 parts by mass of Resin Component | | | | parts by mass | 3.2 | 3.2 | 3.2 |
| Mixing Ratio of Saturated Polyester to 100 parts by mass of Resin Component | | | | parts by mass | 6.0 | 6.0 | 6.0 |
| Mixing Ratio of Electrically Conductive Filler to 100 parts by mass of Resin Component | | | | parts by mass | 12.5 | 12.5 | 0 |
| Mixing Ratio of Electrically Conductive Fiber to 100 parts by mass of Resin Component | | | | parts by mass | 10 | 10 | — |
| Ratio of Electrically Conductive Fiber | Electrically Conductive Short Fiber | | | % by mass | 14.5 | 14.5 | 14.5 |
| | Electrically Conductive Medium Long Fiber | Electrically Conductive Medium Fiber | | % by mass | 85.5 | 85.5 | 85.5 |
| | | Electrically Conductive Long Fiber | | % by mass | — | — | — |
| Volume Content Ratio of Molding Material | Filler-Excluding Component | | | % by volume | 62.8 | 31.1 | 49.2 |
| | Electrically Conductive Filler | | | % by volume | 5.2 | 2.2 | — |
| | Calcium Carbonate | | | % by volume | — | — | — |
| | Aluminum Hydroxide | | | % by volume | 12.4 | 46.6 | 31.0 |
| | Reinforcing Fiber | | | % by volume | 19.6 | 20.0 | 19.9 |

TABLE 5

| | | | Unit | Ex. 1 | Ex. 2 | Ex. 3 | Ex. 4 |
|---|---|---|---|---|---|---|---|
| Evaluation | Molding Shrinkage Rate | Judgement | — | Excellent | Excellent | Good | Good |
| | | Shrinkage Rate | % | −0.03 | −0.02 | 0.01 | 0.01 |
| | Flame Retardancy | Judgement | — | Excellent | Excellent | Excellent | Excellent |
| | | V0/4 mm | — | Conformity | Conformity | Conformity | Conformity |
| | | V0/3 mm | — | Conformity | Conformity | Conformity | Conformity |
| | | V0/2.5 mm | — | Conformity | Conformity | Conformity | Conformity |
| | Fuming Properties | | — | — | Excellent | Excellent | Excellent |
| | Linear Expansion Coefficient | Judgement | — | Very Good | Very Good | Very Good | Very Good |
| | | Linear Expansion Coefficient | ppm/° C. | 18.6 | 18.7 | 19.1 | 19.2 |
| | | Absolute Value of Difference from Linear Expansion Coefficient of Aluminum | — | 4.4 | 4.3 | 3.9 | 3.8 |
| | Density | | g/ml | 1.90 | 1.87 | 1.82 | 1.82 |
| | Electromagnetic Shielding Properties | Judgement | — | Excellent | Excellent | Good | Excellent |
| | | Electromagnetic Shield of 1 MHz | dB | 74 | 69 | 54 | 64 |
| | | Electromagnetic Shield of 10 MHz | dB | 57 | 53 | 41 | 49 |
| | | Electromagnetic Shield of 100 MHz | dB | 42 | 36 | 25 | 30 |
| | | Electromagnetic Shield of 1000 MHz | dB | 24 | 20 | 13 | 17 |
| | Production Stability | Impregnation State/Film Peeling | — | Excellent/Excellent | Excellent/Excellent | Excellent/Excellent | Excellent/Excellent |
| | Surface Resistivity | | Ω | $1.2 \times 10^6$ | $1.4 \times 10^6$ | $1.9 \times 10^6$ | $1.6 \times 10^6$ |
| | Bending Properties (23° C.) | Bending Elastic Modulus | GPa | 14.1 | 13.7 | 13.0 | 12.4 |
| | | Bending Strength | MPa | 203 | 196 | 177 | 197 |
| | | Specific Rigidity | $(MPa)^{1/3}/(g/ml)$ | 12.7 | 12.8 | 12.9 | 12.7 |
| | Bending Properties (80° C.) | Bending Elastic Modulus | GPa | 10.7 | 10.4 | 9.9 | 9.4 |
| | | Bending Strength | MPa | 130 | 125 | 113 | 126 |
| | | Specific Rigidity | $(MPa)^{1/3}/(g/ml)$ | 11.6 | 11.7 | 11.8 | 11.6 |
| | Tensile Properties | Tensile Elastic Modulus | GPa | 14.8 | 14.4 | 13.7 | 13.0 |
| | | Tensile Strength | MPa | 101 | 98 | 89 | 98 |

| | | | Unit | Ex. 5 | Ex. 6 | Ex. 7 |
|---|---|---|---|---|---|---|
| Evaluation | Molding Shrinkage Rate | Judgement | — | Good | Good | Good |
| | | Shrinkage Rate | % | 0.06 | 0.03 | 0.06 |
| | Flame Retardancy | Judgement | — | Excellent | Excellent | Excellent |
| | | V0/4 mm | — | Conformity | Conformity | Conformity |
| | | V0/3 mm | — | Conformity | Conformity | Conformity |
| | | V0/2.5 mm | — | Conformity | Conformity | Conformity |
| | Fuming Properties | | — | Excellent | Excellent | Excellent |
| | Linear Expansion Coefficient | Judgement | — | Excellent | Very Good | Very Good |
| | | Linear Expansion Coefficient | ppm/° C. | 19.6 | 19.3 | 19.7 |
| | | Absolute Value of Difference from Linear Expansion Coefficient of Aluminum | — | 3.4 | 3.7 | 3.3 |
| | Density | | g/ml | 1.82 | 1.82 | 1.81 |
| | Electromagnetic Shielding Properties | Judgement | — | Good | Good | Fair |
| | | Electromagnetic Shield of 1 MHz | dB | 58 | 56 | 38 |
| | | Electromagnetic Shield of 10 MHz | dB | 44 | 43 | 28 |
| | | Electromagnetic Shield of 100 MHz | dB | 26 | 24 | 11 |
| | | Electromagnetic Shield of 1000 MHz | dB | 15 | 14 | 5 |
| | Production Stability | Impregnation State/Film Peeling | — | Good/Excellent | Good/Excellent | Excellent/Excellent |
| | Surface Resistivity | | Ω | $1.8 \times 10^6$ | $1.9 \times 10^6$ | $2.7 \times 10^6$ |
| | Bending Properties (23° C.) | Bending Elastic Modulus | GPa | 13.7 | 11.8 | 11.9 |
| | | Bending Strength | MPa | 196 | 183 | 184 |
| | | Specific Rigidity | $(MPa)^{1/3}/(g/ml)$ | 13.2 | 12.5 | 12.6 |
| | Bending Properties (80° C.) | Bending Elastic Modulus | GPa | 10.4 | 9.0 | 9.0 |
| | | Bending Strength | MPa | 125 | 117 | 118 |
| | | Specific Rigidity | $(MPa)^{1/3}/(g/ml)$ | 12.0 | 11.4 | 11.5 |
| | Tensile Properties | Tensile Elastic Modulus | GPa | 14.4 | 12.4 | 12.5 |
| | | Tensile Strength | MPa | 98 | 92 | 92 |

TABLE 6

| | | | Unit | Example No. | | | |
|---|---|---|---|---|---|---|---|
| | | | | Ex. 8 | Ex. 9 | Ex. 10 | Ex. 11 |
| Evaluation | Molding Shrinkage Rate | Judgement | — | Good | Good | Good | Good |
| | | Shrinkage Rate | % | 0.02 | 0.04 | 0.04 | 0.03 |
| | Flame Retardancy | Judgement | — | Excellent | Excellent | Excellent | Excellent |
| | | V0/4 mm | — | Conformity | Conformity | Conformity | Conformity |
| | | V0/3 mm | — | Conformity | Conformity | Conformity | Conformity |
| | | V0/2.5 mm | — | Conformity | Conformity | Conformity | Conformity |
| | Fuming Properties | | — | Excellent | Excellent | Excellent | Excellent |
| | Linear Expansion Coefficient | Judgement | — | Very Good | Very Good | Very Good | Very Good |
| | | Linear Expansion Coefficient | ppm/°C. | 19.3 | 19.3 | 19.3 | 19.4 |
| | | Absolute Value of Difference from Linear Expansion Coefficient of Aluminum | — | 3.7 | 3.7 | 3.7 | 3.6 |
| | Density | | g/ml | 1.793 | 1.787 | 1.759 | 1.82 |
| | Electromagnetic Shielding Properties | Judgement | — | Good | Fair | Fair | Good |
| | | Electromagnetic Shield of 1 MHz | dB | 49 | 39 | 38 | 45 |
| | | Electromagnetic Shield of 10 MHz | dB | 37 | 30 | 29 | 34 |
| | | Electromagnetic Shield of 100 MHz | dB | 20 | 18 | 16 | 18 |
| | | Electromagnetic Shield of 1000 MHz | dB | 11 | 10 | 10 | 10 |
| | Production Stability | Impregnation State/Film Peeling | — | Excellent/Excellent | Good/Excellent | Good/Excellent | Excellent/Excellent |
| | Surface Resistivity | | Ω | $2.1 \times 10^6$ | $2.3 \times 10^6$ | $2.4 \times 10^6$ | $2.2 \times 10^6$ |
| | Bending Properties (23°C.) | Bending Elastic Modulus | GPa | 13.0 | 13.4 | 10.8 | 12.6 |
| | | Bending Strength | MPa | 170 | 161 | 173 | 175 |
| | | Specific Rigidity | $(MPa)^{1/3}/(g/ml)$ | 13.1 | 13.3 | 12.6 | 12.8 |
| | Bending Properties (80°C.) | Bending Elastic Modulus | GPa | 9.9 | 10.2 | 8.2 | 9.6 |
| | | Bending Strength | MPa | 109 | 103 | 111 | 112 |
| | | Specific Rigidity | $(MPa)^{1/3}/(g/ml)$ | 12.0 | 12.1 | 11.5 | 11.7 |
| | Tensile Properties | Tensile Elastic Modulus | GPa | 13.6 | 14.1 | 11.4 | 13.2 |
| | | Tensile Strength | MPa | 85 | 80 | 86 | 88 |

| | | | Unit | Example No. | | |
|---|---|---|---|---|---|---|
| | | | | Ex. 12 | Ex. 13 | Ex. 14 |
| Evaluation | Molding Shrinkage Rate | Judgement | — | Good | Good | Good |
| | | Shrinkage Rate | % | 0.03 | 0.03 | 0.02 |
| | Flame Retardancy | Judgement | — | Excellent | Excellent | Excellent |
| | | V0/4 mm | — | Conformity | Conformity | Conformity |
| | | V0/3 mm | — | Conformity | Conformity | Conformity |
| | | V0/2.5 mm | — | Conformity | Conformity | Conformity |
| | Fuming Properties | | — | Excellent | Excellent | Excellent |
| | Linear Expansion Coefficient | Judgement | — | Very Good | Very Good | Very Good |
| | | Linear Expansion Coefficient | ppm/°C. | 19.4 | 19.4 | 19.4 |
| | | Absolute Value of Difference from Linear Expansion Coefficient of Aluminum | — | 3.6 | 3.6 | 3.6 |
| | Density | | g/ml | 1.82 | 1.82 | 1.82 |
| | Electromagnetic Shielding Properties | Judgement | — | Good | Good | Fair |
| | | Electromagnetic Shield of 1 MHz | dB | 45 | 45 | 39 |
| | | Electromagnetic Shield of 10 MHz | dB | 34 | 34 | 29 |
| | | Electromagnetic Shield of 100 MHz | dB | 18 | 18 | 16 |
| | | Electromagnetic Shield of 1000 MHz | dB | 10 | 10 | 8 |
| | Production Stability | Impregnation State/Film Peeling | — | Excellent/Excellent | Excellent/Excellent | Excellent/Excellent |
| | Surface Resistivity | | Ω | $2.2 \times 10^6$ | $2.2 \times 10^6$ | $2.2 \times 10^6$ |
| | Bending Properties (23°C.) | Bending Elastic Modulus | GPa | 12.6 | 13.2 | 12.3 |
| | | Bending Strength | MPa | 175 | 193 | 167 |
| | | Specific Rigidity | $(MPa)^{1/3}/(g/ml)$ | 12.8 | 13.0 | 12.7 |
| | Bending Properties (80°C.) | Bending Elastic Modulus | GPa | 9.6 | 10.1 | 9.6 |
| | | Bending Strength | MPa | 112 | 112 | 112 |
| | | Specific Rigidity | $(MPa)^{1/3}/(g/ml)$ | 11.7 | 11.9 | 11.7 |
| | Tensile Properties | Tensile Elastic Modulus | GPa | 13.2 | 13.2 | 13.2 |
| | | Tensile Strength | MPa | 88 | 96 | 88 |

TABLE 7

| | | | Unit | Ex. 15 | Ex. 16 | Ex. 17 | Ex. 18 |
|---|---|---|---|---|---|---|---|
| Evaluation | Molding Shrinkage Rate | Judgement | — | Good | Good | Good | Good |
| | | Shrinkage Rate | % | 0.04 | 0.04 | 0.04 | 0.04 |
| | Flame Retardancy | Judgement | — | Excellent | Excellent | Excellent | Excellent |
| | | V0/4 mm | — | Conformity | Conformity | Conformity | Conformity |
| | | V0/3 mm | — | Conformity | Conformity | Conformity | Conformity |
| | | V0/2.5 mm | — | Conformity | Conformity | Conformity | Conformity |
| | Fuming Properties | | — | Excellent | Excellent | Excellent | Excellent |
| | Linear Expansion Coefficient | Judgement | — | Very Good | Bad | Bad | Bad |
| | | Linear Expansion Coefficient | ppm/° C. | 19.4 | 19.4 | 19.4 | 19.4 |
| | | Absolute Value of Difference from Linear Expansion Coefficient of Aluminum | — | 3.6 | 3.6 | 3.6 | 3.6 |
| | Density | | g/ml | 1.82 | 1.82 | 1.82 | 1.82 |
| | Electromagnetic Shielding Properties | Judgement | — | Good | Fair | Bad | Poor |
| | | Electromagnetic Shield of 1 MHz | dB | 41 | 32 | 0 | 29 |
| | | Electromagnetic Shield of 10 MHz | dB | 31 | 24 | 0 | 22 |
| | | Electromagnetic Shield of 100 MHz | dB | 17 | 13 | 0 | 12 |
| | | Electromagnetic Shield of 1000 MHz | dB | 9 | 7 | 0 | 6 |
| | Production Stability | Impregnation State/Film Peeling | — | Excellent/Excellent | Excellent/Excellent | Excellent/Excellent | Excellent/Excellent |
| | Surface Resistivity | | Ω | $2.4 \times 10^6$ | $2.6 \times 10^6$ | $3.7 \times 10^6$ | $2.7 \times 10^6$ |
| | Bending Properties (23° C.) | Bending Elastic Modulus | GPa | 12.5 | 12.6 | 12.6 | 12.6 |
| | | Bending Strength | MPa | 187 | 176 | 175 | 174 |
| | | Specific Rigidity | $(MPa)^{1/3}/(g/ml)$ | 12.7 | 12.8 | 12.8 | 12.8 |
| | Bending Properties (80° C.) | Bending Elastic Modulus | GPa | 9.5 | 9.5 | 9.6 | 9.6 |
| | | Bending Strength | MPa | 120 | 112 | 112 | 112 |
| | | Specific Rigidity | $(MPa)^{1/3}/(g/ml)$ | 11.6 | 11.7 | 11.7 | 11.7 |
| | Tensile Properties | Tensile Elastic Modulus | GPa | 13.1 | 13.2 | 13.2 | 13.3 |
| | | Tensile Strength | MPa | 93 | 88 | 88 | 87 |

| | | | Unit | Ex. 19 | Ex. 20 | Ex. 21 |
|---|---|---|---|---|---|---|
| Evaluation | Molding Shrinkage Rate | Judgement | — | Good | Good | Good |
| | | Shrinkage Rate | % | 0.05 | 0.03 | 0.03 |
| | Flame Retardancy | Judgement | — | Excellent | Excellent | Excellent |
| | | V0/4 mm | — | Conformity | Conformity | Conformity |
| | | V0/3 mm | — | Conformity | Conformity | Conformity |
| | | V0/2.5 mm | — | Conformity | Conformity | Conformity |
| | Fuming Properties | | — | Excellent | Excellent | Excellent |
| | Linear Expansion Coefficient | Judgement | — | Very Good | Very Good | Excellent |
| | | Linear Expansion Coefficient | ppm/° C. | 18.8 | 19.2 | 19.3 |
| | | Absolute Value of Difference from Linear Expansion Coefficient of Aluminum | — | 4.3 | 3.8 | 3.7 |
| | Density | | g/ml | 1.90 | 1.82 | 1.82 |
| | Electromagnetic Shielding Properties | Judgement | — | Excellent | Fair | Fair |
| | | Electromagnetic Shield of 1 MHz | dB | 69 | 36 | 31 |
| | | Electromagnetic Shield of 10 MHz | dB | 53 | 27 | 24 |
| | | Electromagnetic Shield of 100 MHz | dB | 36 | 14 | 13 |
| | | Electromagnetic Shield of 1000 MHz | dB | 20 | 8 | 7 |
| | Production Stability | Impregnation State/Film Peeling | — | Bad/Excellent | Excellent/Excellent | Excellent/Excellent |
| | Surface Resistivity | | Ω | $1.4 \times 10^6$ | $2.3 \times 10^6$ | $2.3 \times 10^6$ |
| | Bending Properties (23° C.) | Bending Elastic Modulus | GPa | 13.7 | 12.7 | 12.5 |
| | | Bending Strength | MPa | 166 | 174 | 175 |
| | | Specific Rigidity | $(MPa)^{1/3}/(g/ml)$ | 12.6 | 12.8 | 12.8 |
| | Bending Properties (80° C.) | Bending Elastic Modulus | GPa | 10.4 | 9.7 | 9.5 |
| | | Bending Strength | MPa | 107 | 111 | 112 |
| | | Specific Rigidity | $(MPa)^{1/3}/(g/ml)$ | 11.5 | 11.7 | 11.6 |
| | Tensile Properties | Tensile Elastic Modulus | GPa | 14.4 | 13.3 | 13.2 |
| | | Tensile Strength | MPa | 83 | 87 | 87 |

TABLE 8

| | | | Comparative Ex. No. | | | |
|---|---|---|---|---|---|---|
| | | Unit | Comp. Ex. 1 | Comp. Ex. 2 | Comp. Ex. 3 | Comp. Ex. 4 |
| Evaluation Molding Shrinkage Rate | Judgement | — | Bad | Bad | Bad | Good |
| | Shrinkage Rate | % | 0.19 | 0.25 | 0.21 | 0.02 |
| Flame Retardancy | Judgement | — | Excellent | Good | Excellent | Excellent |
| | V0/4 mm | — | Conformity | Conformity | Conformity | Conformity |
| | V0/3 mm | — | Conformity | Conformity | Conformity | Conformity |
| | V0/2.5 mm | — | Conformity | Non-Conformity | Conformity | Conformity |
| Fuming Properties | | — | Excellent | Excellent | Excellent | Excellent |
| Linear Expansion Coefficient | Judgement | — | Very Good | Very Good | Very Good | Very Good |
| | Linear Expansion Coefficient | ppm/° C. | 19.4 | 19.4 | 19.3 | 19.3 |
| | Absolute Value of Difference from Linear Expansion Coefficient of Aluminum | — | 3.6 | 3.6 | 3.7 | 3.7 |
| Density | | g/ml | 1.82 | 1.82 | 1.82 | 1.82 |
| Electromagnetic Shielding Properties | Judgement | — | Good | Good | Good | Good |
| | Electromagnetic Shield of 1 MHz | dB | 45 | 45 | 45 | 46 |
| | Electromagnetic Shield of 10 MHz | dB | 34 | 34 | 34 | 35 |
| | Electromagnetic Shield of 100 MHz | dB | 18 | 18 | 18 | 18 |
| | Electromagnetic Shield of 1000 MHz | dB | 10 | 10 | 10 | 10 |
| Production Stability | Impregnation State/Film Peeling | — | Excellent/Excellent | Excellent/Excellent | Excellent/Excellent | Excellent/Bad |
| Surface Resistivity | | Ω | $2.3 \times 10^6$ | $2.2 \times 10^6$ | $2.2 \times 10^6$ | $2.2 \times 10^6$ |
| Bending Properties (23° C.) | Bending Elastic Modulus | GPa | 12.7 | 12.6 | 12.7 | 12.6 |
| | Bending Strength | MPa | 175 | 174 | 175 | 176 |
| | Specific Rigidity | $(MPa)^{1/3}/(g/ml)$ | 12.8 | 12.8 | 12.8 | 12.8 |
| Bending Properties (80° C.) | Bending Elastic Modulus | GPa | 9.6 | 9.6 | 9.6 | 9.6 |
| | Bending Strength | MPa | 112 | 112 | 112 | 112 |
| | Specific Rigidity | $(MPa)^{1/3}/(g/ml)$ | 11.7 | 11.7 | 11.7 | 11.7 |
| Tensile Properties | Tensile Elastic Modulus | GPa | 13.3 | 13.3 | 13.3 | 13.3 |
| | Tensile Strength | MPa | 88 | 87 | 88 | 88 |

| | | | Comparative Ex. No. | | | |
|---|---|---|---|---|---|---|
| | | Unit | Comp. Ex. 5 | Comp. Ex. 6 | Comp. Ex. 7 | Comp. Ex. 8 |
| Evaluation Molding Shrinkage Rate | Judgement | — | Good | Good | Good | Good |
| | Shrinkage Rate | % | 0.03 | 0.04 | 0.04 | 0.05 |
| Flame Retardancy | Judgement | — | Bad | Bad | Excellent | Excellent |
| | V0/4 mm | — | Non-Conformity | Conformity | Conformity | Conformity |
| | V0/3 mm | — | Non-Conformity | Non-Conformity | Conformity | Conformity |
| | V0/2.5 mm | — | Non-Conformity | Non-Conformity | Conformity | Conformity |
| Fuming Properties | | — | Excellent | Excellent | Excellent | Excellent |
| Linear Expansion Coefficient | Judgement | — | Bad | Very Good | Bad | Bad |
| | Linear Expansion Coefficient | ppm/° C. | 14.5 | 20.5 | 14.1 | 19.4 |
| | Absolute Value of Difference from Linear Expansion Coefficient of Aluminum | — | 8.6 | 2.5 | 8.9 | 3.6 |
| Density | | g/ml | 1.91 | 1.72 | 2.03 | 1.80 |
| Electromagnetic Shielding Properties | Judgement | — | Good | Good | Good | Bad |
| | Electromagnetic Shield of 1 MHz | dB | 45 | 46 | 46 | 0 |
| | Electromagnetic Shield of 10 MHz | dB | 34 | 35 | 35 | 0 |
| | Electromagnetic Shield of 100 MHz | dB | 18 | 18 | 18 | 0 |
| | Electromagnetic Shield of 1000 MHz | dB | 10 | 10 | 10 | 0 |
| Production Stability | Impregnation State/Film Peeling | — | Excellent/Excellent | Excellent/Excellent | Bad/Excellent | Excellent/Excellent |
| Surface Resistivity | | Ω | $2.2 \times 10^6$ | $2.2 \times 10^6$ | $2.2 \times 10^6$ | $3.7 \times 10^9$ |
| Bending Properties (23° C.) | Bending Elastic Modulus | GPa | 12.6 | 12.6 | 12.6 | 12.6 |
| | Bending Strength | MPa | 175 | 176 | 176 | 175 |
| | Specific Rigidity | $(MPa)^{1/3}/(g/ml)$ | 12.2 | 13.6 | 11.5 | 12.9 |
| Bending Properties (80° C.) | Bending Elastic Modulus | GPa | 9.6 | 9.6 | 9.6 | 9.6 |
| | Bending Strength | MPa | 112 | 113 | 112 | 112 |
| | Specific Rigidity | $(MPa)^{1/3}/(g/ml)$ | 11.1 | 12.4 | 10.5 | 11.8 |
| Tensile Properties | Tensile Elastic Modulus | GPa | 13.3 | 13.2 | 13.3 | 13.2 |
| | Tensile Strength | MPa | 88 | 88 | 88 | 88 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The unsaturated polyester resin composition, the molding material, and the molded article of the present invention can be preferably used in a battery pack casing for an electric vehicle and the like.

The battery pack casing for an electric vehicle of the present invention can be preferably used for a vehicle requiring low shrinkage, flame retardancy, electromagnetic shielding properties, and dimensional stability.

DESCRIPTION OF REFERENCE NUMBER

1 Battery pack casing for electric vehicle
2 Tray member
3 Cover member

The invention claimed is:

1. An unsaturated polyester resin composition comprising:
a resin component including an unsaturated polyester, a polymerizable monomer, and a low shrinkage agent; aluminum hydroxide; and an electrically conductive filler, wherein
the unsaturated polyester is a polymerization product of a polybasic acid and a polyhydric alcohol;
the polybasic acid includes a polybasic acid having an ethylenically unsaturated double bond;
a mixing ratio of the polybasic acid having an ethylenically unsaturated double bond is 80 mol % or more with respect to 100 mol % of the polybasic acid;
the low shrinkage agent includes polyvinyl acetate;
a mixing ratio of the polyvinyl acetate is 3 parts by mass or more and 10 parts by mass or less with respect to 100 parts by mass of the resin component;
a mixing ratio of the aluminum hydroxide is 50 parts by mass or more and 300 parts by mass or less with respect to 100 parts by mass of the resin component;
the electrically conductive filler includes an electrically conductive fiber;
the electrically conductive fiber includes an electrically conductive short fiber having a fiber length of 0.01 mm or more and 0.15 mm or less; and
a mixing ratio of the electrically conductive short fiber is 12% by mass or more and 50% by mass or less with respect to the electrically conductive fiber.

2. The unsaturated polyester resin composition according to claim 1, wherein
a mixing ratio of the electrically conductive filler is 8 parts by mass or more and 25 parts by mass or less with respect to 100 parts by mass of the resin component.

3. The unsaturated polyester resin composition according to claim 1, wherein
a mixing ratio of the electrically conductive fiber is 8 parts by mass or more and 21 parts by mass or less with respect to 100 parts by mass of the resin component.

4. The unsaturated polyester resin composition according to claim 1, wherein
the electrically conductive fiber includes an electrically conductive long fiber having a fiber length of 1.5 mm or more and 5 mm or less, and
a mixing ratio of the electrically conductive long fiber is 10% by mass or more and 30% by mass or less with respect to the electrically conductive fiber.

5. The unsaturated polyester resin composition according to claim 1, wherein
the electrically conductive filler includes an electrically conductive particle.

6. The unsaturated polyester resin composition according to claim 5, wherein
a mixing ratio of the electrically conductive particle is 1 part by mass or more and 5 parts by mass or less with respect to 100 parts by mass of the resin component.

7. The unsaturated polyester resin composition according to claim 1, wherein the electrically conductive filler includes a carbon nanotube.

8. A molding material comprising:
the unsaturated polyester resin composition according to claim 1 and a reinforcing fiber.

9. A molded article comprising:
a cured product of the molding material according to claim 8.

10. The molded article according to claim 9, wherein
a linear expansion coefficient is 17 ppm/° C. or more and 25 ppm/° C. or less.

11. The molded article according to claim 9 for a battery pack casing for an electric vehicle.

12. A battery pack casing for an electric vehicle comprising:
an aluminum member and the molded article according to claim 9 used in combination with the aluminum member.

* * * * *